(12) United States Patent
Hegde et al.

(10) Patent No.: US 10,855,562 B2
(45) Date of Patent: Dec. 1, 2020

(54) TRAFFIC DEDUPLICATION IN A VISIBILITY NETWORK

(71) Applicant: Extreme Networks, Inc., San Jose, CA (US)

(72) Inventors: Deepak Hegde, Bangalore (IN); Shailender Sharma, Banglore (IN); Rakesh Varimalla, Banglore (IN)

(73) Assignee: Extreme Networks, LLC, San Jose, CA (US)

( * ) Notice: Subject to any disclaimer, the term of this patent is extended or adjusted under 35 U.S.C. 154(b) by 0 days.

(21) Appl. No.: 16/148,969

(22) Filed: Oct. 1, 2018

(65) Prior Publication Data
US 2019/0149437 A1    May 16, 2019

Related U.S. Application Data

(63) Continuation of application No. 15/206,008, filed on Jul. 8, 2016, now Pat. No. 10,091,075.

(30) Foreign Application Priority Data

Feb. 12, 2016 (IN) .............................. 201641005019

(51) Int. Cl.
*H04L 12/26* (2006.01)
*H04L 29/06* (2006.01)
(Continued)

(52) U.S. Cl.
CPC ............ *H04L 43/028* (2013.01); *H04J 11/00* (2013.01); *H04L 43/12* (2013.01); *H04L 47/125* (2013.01); *H04L 69/22* (2013.01)

(58) Field of Classification Search
CPC .... H04W 24/00; H04L 43/50; H04L 43/0852; H04L 43/08; H04B 17/003
See application file for complete search history.

(56) References Cited

U.S. PATENT DOCUMENTS 5,031,094 A   7/1991   Toegel et al.
5,359,593 A   10/1994  Derby et al.
(Continued)

FOREIGN PATENT DOCUMENTS

CN   101677292 A   3/2010
EP   2654340 A1   10/2013
(Continued)

OTHER PUBLICATIONS

7433 GTP Session Controller, www.ixia.com, downloaded circa Apr. 2, 2015, pp. 1-3.
(Continued)

*Primary Examiner* — Siren Wei
(74) *Attorney, Agent, or Firm* — Sterne, Kessler, Goldstein & Fox P.L.L.C.

(57) ABSTRACT

Techniques for implementing traffic deduplication in a visibility network are provided. According to one embodiment, a packet broker of the visibility network can receive a control or data packet replicated from a core network. The packet broker can then apply a first stage deduplication process in which the packet broker attempts to deduplicate the control or data packet based on one or more interfaces of the core network from which the control or data packet originated, and apply a second stage deduplication process in which the packet broker attempts to deduplicate the control or data packet based on the content (e.g., payload) of the control or data packet.

17 Claims, 9 Drawing Sheets

(51) Int. Cl.
*H04J 11/00* (2006.01)
*H04L 12/803* (2013.01)

(56) References Cited

U.S. PATENT DOCUMENTS

| | | |
|---|---|---|
| 5,948,061 A | 9/1999 | Merriman et al. |
| 5,951,634 A | 9/1999 | Sitbon et al. |
| 6,006,269 A | 12/1999 | Phaal et al. |
| 6,006,333 A | 12/1999 | Nielsen et al. |
| 6,078,956 A | 6/2000 | Bryant et al. |
| 6,092,178 A | 7/2000 | Jindal et al. |
| 6,112,239 A | 8/2000 | Kenner et al. |
| 6,115,752 A | 9/2000 | Chauhan et al. |
| 6,128,279 A | 10/2000 | O'Neil et al. |
| 6,128,642 A | 10/2000 | Doraswamy et al. |
| 6,148,410 A | 11/2000 | Baskey et al. |
| 6,167,445 A | 12/2000 | Gai et al. |
| 6,167,446 A | 12/2000 | Lister et al. |
| 6,182,139 B1 | 1/2001 | Brendel et al. |
| 6,195,691 B1 | 2/2001 | Brown et al. |
| 6,205,477 B1 | 3/2001 | Johnson et al. |
| 6,233,604 B1 | 5/2001 | Van et al. |
| 6,260,070 B1 | 7/2001 | Shah et al. |
| 6,286,039 B1 | 9/2001 | Van et al. |
| 6,286,047 B1 | 9/2001 | Ramanathan et al. |
| 6,304,913 B1 | 10/2001 | Rune et al. |
| 6,324,580 B1 | 11/2001 | Jindal et al. |
| 6,327,622 B1 | 12/2001 | Jindal et al. |
| 6,336,137 B1 | 1/2002 | Lee et al. |
| 6,381,627 B1 | 4/2002 | Kwan et al. |
| 6,389,462 B1 | 5/2002 | Cohen et al. |
| 6,427,170 B1 | 7/2002 | Sitaraman et al. |
| 6,434,118 B1 | 8/2002 | Kirschenbaum et al. |
| 6,438,652 B1 | 8/2002 | Jordan et al. |
| 6,446,121 B1 | 9/2002 | Shah et al. |
| 6,449,657 B2 | 9/2002 | Stanbach et al. |
| 6,470,389 B1 | 10/2002 | Chung et al. |
| 6,473,802 B2 | 10/2002 | Masters et al. |
| 6,480,508 B1 | 11/2002 | Mwikalo et al. |
| 6,490,624 B1 | 12/2002 | Sampson et al. |
| 6,549,944 B1 | 4/2003 | Weinberg et al. |
| 6,567,377 B1 | 5/2003 | Vepa et al. |
| 6,578,066 B1 | 6/2003 | Logan et al. |
| 6,606,643 B1 | 8/2003 | Emens et al. |
| 6,665,702 B1 | 12/2003 | Zisapel et al. |
| 6,671,275 B1 | 12/2003 | Wong et al. |
| 6,681,232 B1 | 1/2004 | Sistanizadeh et al. |
| 6,681,323 B1 | 1/2004 | Fontanesi et al. |
| 6,691,165 B1 | 2/2004 | Bruck et al. |
| 6,697,368 B2 | 2/2004 | Chang et al. |
| 6,735,218 B2 | 5/2004 | Chang et al. |
| 6,745,241 B1 | 6/2004 | French et al. |
| 6,751,616 B1 | 6/2004 | Chan et al. |
| 6,754,706 B1 | 6/2004 | Swildens et al. |
| 6,772,211 B2 | 8/2004 | Lu et al. |
| 6,779,017 B1 | 8/2004 | Lamberton et al. |
| 6,789,125 B1 | 9/2004 | Aviani et al. |
| 6,821,891 B2 | 11/2004 | Chen et al. |
| 6,826,198 B2 | 11/2004 | Turina et al. |
| 6,831,891 B2 | 12/2004 | Mansharamani et al. |
| 6,839,700 B2 | 1/2005 | Doyle et al. |
| 6,850,984 B1 | 2/2005 | Kalkunte et al. |
| 6,874,152 B2 | 3/2005 | Vermeire et al. |
| 6,879,995 B1 | 4/2005 | Chinta et al. |
| 6,898,633 B1 | 5/2005 | Lyndersay et al. |
| 6,901,072 B1 | 5/2005 | Wong et al. |
| 6,901,081 B1 | 5/2005 | Ludwig et al. |
| 6,920,498 B1 | 7/2005 | Gourlay et al. |
| 6,928,485 B1 | 8/2005 | Krishnamurthy et al. |
| 6,944,678 B2 | 9/2005 | Lu et al. |
| 6,963,914 B1 | 11/2005 | Breitbart et al. |
| 6,963,917 B1 | 11/2005 | Callis et al. |
| 6,985,956 B2 | 1/2006 | Luke et al. |
| 6,987,763 B2 | 1/2006 | Rochberger et al. |
| 6,996,615 B1 | 2/2006 | McGuire et al. |
| 6,996,616 B1 | 2/2006 | Leighton et al. |
| 7,000,007 B1 | 2/2006 | Valenti et al. |
| 7,009,086 B2 | 3/2006 | Brown et al. |
| 7,009,968 B2 | 3/2006 | Ambe et al. |
| 7,020,698 B2 | 3/2006 | Andrews et al. |
| 7,020,714 B2 | 3/2006 | Kalyanaraman et al. |
| 7,028,083 B2 | 4/2006 | Levine et al. |
| 7,031,304 B1 | 4/2006 | Arberg et al. |
| 7,032,010 B1 | 4/2006 | Swildens et al. |
| 7,036,039 B2 | 4/2006 | Holland et al. |
| 7,058,706 B1 | 6/2006 | Iyer et al. |
| 7,058,717 B2 | 6/2006 | Chao et al. |
| 7,062,642 B1 | 6/2006 | Langrind et al. |
| 7,086,061 B1 | 8/2006 | Joshi et al. |
| 7,089,293 B2 | 8/2006 | Grosner et al. |
| 7,095,738 B1 | 8/2006 | Desanti et al. |
| 7,117,530 B1 | 10/2006 | Lin et al. |
| 7,126,910 B1 | 10/2006 | Sridhar et al. |
| 7,127,713 B2 | 10/2006 | Davis et al. |
| 7,136,932 B1 | 11/2006 | Schneider et al. |
| 7,139,242 B2 | 11/2006 | Bays et al. |
| 7,177,933 B2 | 2/2007 | Foth et al. |
| 7,177,943 B1 | 2/2007 | Temoshenko et al. |
| 7,185,052 B2 | 2/2007 | Day et al. |
| 7,187,687 B1 | 3/2007 | Davis et al. |
| 7,188,189 B2 | 3/2007 | Karol et al. |
| 7,197,547 B1 | 3/2007 | Miller et al. |
| 7,206,806 B2 | 4/2007 | Pineau et al. |
| 7,215,637 B1 | 5/2007 | Ferguson et al. |
| 7,225,272 B2 | 5/2007 | Kelley et al. |
| 7,240,015 B1 | 7/2007 | Karmouch et al. |
| 7,240,100 B1 | 7/2007 | Wein et al. |
| 7,254,626 B1 | 8/2007 | Kommula et al. |
| 7,257,642 B1 | 8/2007 | Bridger et al. |
| 7,260,645 B2 | 8/2007 | Bays et al. |
| 7,266,117 B1 | 9/2007 | Davis et al. |
| 7,266,120 B2 | 9/2007 | Cheng et al. |
| 7,277,954 B1 | 10/2007 | Stewart et al. |
| 7,292,573 B2 | 11/2007 | LaVigne et al. |
| 7,296,088 B1 | 11/2007 | Padmanabhan et al. |
| 7,321,926 B1 | 1/2008 | Zhang et al. |
| 7,424,018 B2 | 9/2008 | Gallatin et al. |
| 7,436,832 B2 | 10/2008 | Gallatin et al. |
| 7,440,467 B2 | 10/2008 | Gallatin et al. |
| 7,441,045 B2 | 10/2008 | Skene et al. |
| 7,450,527 B2 | 11/2008 | Ashwood et al. |
| 7,454,500 B1 | 11/2008 | Hsu et al. |
| 7,483,374 B2 | 1/2009 | Nilakantan et al. |
| 7,492,713 B1 | 2/2009 | Turner et al. |
| 7,506,065 B2 | 3/2009 | Lavigne et al. |
| 7,539,134 B1 | 5/2009 | Bowes et al. |
| 7,555,562 B2 | 6/2009 | See et al. |
| 7,558,195 B1 | 7/2009 | Kuo et al. |
| 7,574,508 B1 | 8/2009 | Kommula et al. |
| 7,581,009 B1 | 8/2009 | Hsu et al. |
| 7,584,301 B1 | 9/2009 | Joshi et al. |
| 7,587,487 B1 | 9/2009 | Gunturu et al. |
| 7,606,203 B1 | 10/2009 | Shabtay et al. |
| 7,647,427 B1 | 1/2010 | Devarapalli et al. |
| 7,657,629 B1 | 2/2010 | Kommula et al. |
| 7,690,040 B2 | 3/2010 | Frattura et al. |
| 7,706,363 B1 | 4/2010 | Daniel et al. |
| 7,716,370 B1 | 5/2010 | Devarapalli et al. |
| 7,720,066 B2 | 5/2010 | Weyman et al. |
| 7,720,076 B2 | 5/2010 | Dobbins et al. |
| 7,746,789 B2 | 6/2010 | Katoh et al. |
| 7,747,737 B1 | 6/2010 | Apte et al. |
| 7,756,965 B2 | 7/2010 | Joshi et al. |
| 7,774,833 B1 | 8/2010 | Szeto et al. |
| 7,787,454 B1 | 8/2010 | Won et al. |
| 7,792,047 B2 | 9/2010 | Gallatin et al. |
| 7,835,348 B2 | 11/2010 | Kasralikar et al. |
| 7,835,358 B2 | 11/2010 | Gallatin et al. |
| 7,840,678 B2 | 11/2010 | Joshi et al. |
| 7,848,326 B1 | 12/2010 | Leong et al. |
| 7,889,748 B1 | 2/2011 | Leong et al. |
| 7,899,899 B2 | 3/2011 | Joshi et al. |
| 7,940,766 B2 | 5/2011 | Olakangil et al. |
| 7,953,089 B1 | 5/2011 | Ramakrishnan et al. |

(56) References Cited

U.S. PATENT DOCUMENTS

| | | |
|---|---|---|
| 8,018,943 B1 | 9/2011 | Pleshek et al. |
| 8,208,494 B2 | 6/2012 | Leong et al. |
| 8,238,344 B1 | 8/2012 | Chen et al. |
| 8,239,960 B2 | 8/2012 | Frattura et al. |
| 8,248,928 B1 | 8/2012 | Wang et al. |
| 8,270,845 B2 | 9/2012 | Cheung et al. |
| 8,315,256 B2 | 11/2012 | Leong et al. |
| 8,386,846 B2 | 2/2013 | Cheung et al. |
| 8,391,286 B2 | 3/2013 | Gallatin et al. |
| 8,504,721 B2 | 8/2013 | Hsu et al. |
| 8,514,718 B2 | 8/2013 | Zijst et al. |
| 8,537,697 B2 | 9/2013 | Leong et al. |
| 8,570,862 B1 | 10/2013 | Leong et al. |
| 8,615,008 B2 | 12/2013 | Natarajan et al. |
| 8,654,651 B2 | 2/2014 | Leong et al. |
| 8,824,466 B2 | 9/2014 | Won et al. |
| 8,830,819 B2 | 9/2014 | Leong et al. |
| 8,873,557 B2 | 10/2014 | Nguyen et al. |
| 8,891,527 B2 | 11/2014 | Wang et al. |
| 8,897,138 B2 | 11/2014 | Yu et al. |
| 8,953,458 B2 | 2/2015 | Leong et al. |
| 9,155,075 B2 | 10/2015 | Song et al. |
| 9,264,446 B2 | 2/2016 | Goldfarb et al. |
| 9,270,566 B2 | 2/2016 | Wang et al. |
| 9,270,592 B1 | 2/2016 | Sites et al. |
| 9,294,367 B2 | 3/2016 | Natarajan et al. |
| 9,356,866 B1 | 5/2016 | Sivaramakrishnan et al. |
| 9,380,002 B2 | 6/2016 | Johansson et al. |
| 9,479,415 B2 | 10/2016 | Natarajan et al. |
| 9,565,138 B2 | 2/2017 | Chen et al. |
| 9,648,542 B2 | 5/2017 | Hsu et al. |
| 2001/0049741 A1 | 12/2001 | Skene et al. |
| 2001/0052016 A1 | 12/2001 | Skene et al. |
| 2002/0009081 A1 | 1/2002 | Sampath et al. |
| 2002/0018796 A1 | 2/2002 | Wironen et al. |
| 2002/0023089 A1 | 2/2002 | Woo et al. |
| 2002/0026551 A1 | 2/2002 | Kamimaki et al. |
| 2002/0038360 A1 | 3/2002 | Andrews et al. |
| 2002/0055939 A1 | 5/2002 | Nardone et al. |
| 2002/0059170 A1 | 5/2002 | Vange et al. |
| 2002/0059464 A1 | 5/2002 | Hata et al. |
| 2002/0062372 A1 | 5/2002 | Hong et al. |
| 2002/0078233 A1 | 6/2002 | Biliris et al. |
| 2002/0091840 A1 | 7/2002 | Pulier et al. |
| 2002/0105966 A1 | 8/2002 | Patel et al. |
| 2002/0112036 A1 | 8/2002 | Bohannon et al. |
| 2002/0120743 A1 | 8/2002 | Shabtay et al. |
| 2002/0124096 A1 | 9/2002 | Loguinov et al. |
| 2002/0133601 A1 | 9/2002 | Kennamer et al. |
| 2002/0150048 A1 | 10/2002 | Ha et al. |
| 2002/0154600 A1 | 10/2002 | Ido et al. |
| 2002/0188862 A1 | 12/2002 | Trethewey et al. |
| 2002/0194324 A1 | 12/2002 | Guha et al. |
| 2002/0194335 A1 | 12/2002 | Maynard et al. |
| 2003/0023744 A1 | 1/2003 | Sadot et al. |
| 2003/0031185 A1 | 2/2003 | Kikuchi et al. |
| 2003/0035430 A1 | 2/2003 | Islam et al. |
| 2003/0065711 A1 | 4/2003 | Acharya et al. |
| 2003/0065763 A1 | 4/2003 | Swildens et al. |
| 2003/0086415 A1* | 5/2003 | Bernhard ............ H04L 1/1809 370/352 |
| 2003/0105797 A1 | 6/2003 | Dolev et al. |
| 2003/0115283 A1 | 6/2003 | Barbir et al. |
| 2003/0135509 A1 | 7/2003 | Davis et al. |
| 2003/0202511 A1 | 10/2003 | Sreejith et al. |
| 2003/0210686 A1 | 11/2003 | Terrell et al. |
| 2003/0210694 A1 | 11/2003 | Jayaraman et al. |
| 2003/0229697 A1 | 12/2003 | Borella et al. |
| 2004/0019680 A1 | 1/2004 | Chao et al. |
| 2004/0024872 A1 | 2/2004 | Kelley et al. |
| 2004/0032868 A1 | 2/2004 | Oda et al. |
| 2004/0064577 A1 | 4/2004 | Dahlin et al. |
| 2004/0194102 A1 | 9/2004 | Neerdaels et al. |
| 2004/0243718 A1 | 12/2004 | Fujiyoshi et al. |
| 2004/0249939 A1 | 12/2004 | Amini et al. |
| 2004/0249971 A1 | 12/2004 | Klinker et al. |
| 2005/0021883 A1 | 1/2005 | Shishizuka et al. |
| 2005/0033858 A1 | 2/2005 | Swildens et al. |
| 2005/0050136 A1 | 3/2005 | Golla et al. |
| 2005/0060418 A1 | 3/2005 | Sorokopud et al. |
| 2005/0060427 A1 | 3/2005 | Phillips et al. |
| 2005/0086295 A1 | 4/2005 | Cunningham et al. |
| 2005/0149531 A1 | 7/2005 | Srivastava et al. |
| 2005/0169180 A1 | 8/2005 | Ludwig et al. |
| 2005/0190695 A1 | 9/2005 | Phaal et al. |
| 2005/0207417 A1 | 9/2005 | Ogawa et al. |
| 2005/0278565 A1 | 12/2005 | Frattura et al. |
| 2005/0286416 A1 | 12/2005 | Shimonishi et al. |
| 2006/0036743 A1 | 2/2006 | Deng et al. |
| 2006/0039374 A1 | 2/2006 | Belz et al. |
| 2006/0045082 A1 | 3/2006 | Fertell et al. |
| 2006/0143300 A1 | 6/2006 | See et al. |
| 2006/0256721 A1 | 11/2006 | Yarlagadda et al. |
| 2007/0044141 A1 | 2/2007 | Lor et al. |
| 2007/0053296 A1 | 3/2007 | Yazaki et al. |
| 2007/0133559 A1* | 6/2007 | Ko .......................... H04L 47/24 370/395.21 |
| 2007/0171918 A1 | 7/2007 | Ota et al. |
| 2007/0195761 A1 | 8/2007 | Tatar et al. |
| 2007/0233891 A1 | 10/2007 | Luby et al. |
| 2008/0002591 A1 | 1/2008 | Ueno et al. |
| 2008/0028077 A1 | 1/2008 | Kamata et al. |
| 2008/0031141 A1 | 2/2008 | Lean et al. |
| 2008/0089336 A1 | 4/2008 | Mercier et al. |
| 2008/0137660 A1 | 6/2008 | Olakangil et al. |
| 2008/0159141 A1 | 7/2008 | Soukup et al. |
| 2008/0181119 A1 | 7/2008 | Beyers et al. |
| 2008/0195731 A1 | 8/2008 | Harmel et al. |
| 2008/0225710 A1 | 9/2008 | Raja et al. |
| 2008/0304423 A1 | 12/2008 | Chuang et al. |
| 2009/0135835 A1 | 5/2009 | Gallatin et al. |
| 2009/0219835 A1* | 9/2009 | Bandholz ............ H04L 12/462 370/255 |
| 2009/0240644 A1 | 9/2009 | Boettcher et al. |
| 2009/0262745 A1 | 10/2009 | Leong et al. |
| 2009/0323703 A1 | 12/2009 | Bragagnini et al. |
| 2010/0011126 A1 | 1/2010 | Hsu et al. |
| 2010/0135323 A1 | 6/2010 | Leong et al. |
| 2010/0209047 A1 | 8/2010 | Cheung et al. |
| 2010/0228974 A1 | 9/2010 | Watts et al. |
| 2010/0293293 A1 | 11/2010 | Beser et al. |
| 2010/0293296 A1 | 11/2010 | Hsu et al. |
| 2010/0325178 A1 | 12/2010 | Won et al. |
| 2011/0044349 A1 | 2/2011 | Gallatin et al. |
| 2011/0058566 A1 | 3/2011 | Leong et al. |
| 2011/0134749 A1 | 6/2011 | Speks et al. |
| 2011/0206055 A1* | 8/2011 | Leong ..................... H04L 49/00 370/401 |
| 2011/0211443 A1 | 9/2011 | Leong et al. |
| 2011/0216771 A1 | 9/2011 | Gallatin et al. |
| 2011/0280149 A1 | 11/2011 | Okada et al. |
| 2012/0023340 A1 | 1/2012 | Cheung et al. |
| 2012/0103518 A1 | 5/2012 | Kakimoto et al. |
| 2012/0155389 A1 | 6/2012 | McNamee et al. |
| 2012/0157088 A1 | 6/2012 | Gerber et al. |
| 2012/0201137 A1 | 8/2012 | Le et al. |
| 2012/0243533 A1 | 9/2012 | Leong et al. |
| 2012/0257635 A1 | 10/2012 | Gallatin et al. |
| 2012/0275311 A1 | 11/2012 | Ivershen et al. |
| 2013/0010613 A1 | 1/2013 | Cafarelli et al. |
| 2013/0028072 A1 | 1/2013 | Addanki et al. |
| 2013/0034107 A1 | 2/2013 | Leong et al. |
| 2013/0151686 A1 | 6/2013 | Takaoka et al. |
| 2013/0156029 A1 | 6/2013 | Gallatin et al. |
| 2013/0173784 A1 | 7/2013 | Wang et al. |
| 2013/0201984 A1 | 8/2013 | Wang et al. |
| 2013/0259037 A1 | 10/2013 | Natarajan et al. |
| 2013/0272135 A1 | 10/2013 | Leong et al. |
| 2014/0016500 A1 | 1/2014 | Leong et al. |
| 2014/0022916 A1 | 1/2014 | Natarajan et al. |
| 2014/0029451 A1 | 1/2014 | Nguyen et al. |
| 2014/0040478 A1 | 2/2014 | Hsu et al. |
| 2014/0101297 A1 | 4/2014 | Neisinger et al. |
| 2014/0204747 A1 | 7/2014 | Yu et al. |

(56) References Cited

U.S. PATENT DOCUMENTS

| | | | |
|---|---|---|---|
| 2014/0219100 A1 | 8/2014 | Pandey et al. | |
| 2014/0233399 A1 | 8/2014 | Mann et al. | |
| 2014/0321278 A1* | 10/2014 | Cafarelli | H04L 47/2441 370/235 |
| 2015/0009828 A1 | 1/2015 | Murakami et al. | |
| 2015/0009830 A1 | 1/2015 | Bisht et al. | |
| 2015/0033169 A1 | 1/2015 | Lection et al. | |
| 2015/0071171 A1 | 3/2015 | Akiyoshi et al. | |
| 2015/0103824 A1 | 4/2015 | Tanabe et al. | |
| 2015/0142935 A1 | 5/2015 | Srinivas et al. | |
| 2015/0170920 A1 | 6/2015 | Purayath et al. | |
| 2015/0180802 A1 | 6/2015 | Chen et al. | |
| 2015/0195192 A1 | 7/2015 | Vasseur et al. | |
| 2015/0207905 A1 | 7/2015 | Merchant et al. | |
| 2015/0215841 A1 | 7/2015 | Hsu et al. | |
| 2015/0256436 A1 | 9/2015 | Stoyanov et al. | |
| 2015/0263889 A1 | 9/2015 | Newton et al. | |
| 2015/0281125 A1 | 10/2015 | Koponen et al. | |
| 2015/0319070 A1 | 11/2015 | Nachum et al. | |
| 2016/0119234 A1 | 4/2016 | Valencia et al. | |
| 2016/0149811 A1 | 5/2016 | Roch et al. | |
| 2016/0164768 A1 | 6/2016 | Natarajan et al. | |
| 2016/0182329 A1 | 6/2016 | Armolavicius et al. | |
| 2016/0182378 A1 | 6/2016 | Basavaraja et al. | |
| 2016/0204996 A1 | 7/2016 | Lindgren et al. | |
| 2016/0226725 A1 | 8/2016 | Iizuka et al. | |
| 2016/0248655 A1 | 8/2016 | Francisco et al. | |
| 2016/0285735 A1 | 9/2016 | Chen et al. | |
| 2016/0285762 A1 | 9/2016 | Chen et al. | |
| 2016/0285763 A1 | 9/2016 | Laxman et al. | |
| 2016/0308766 A1 | 10/2016 | Register et al. | |
| 2016/0316418 A1* | 10/2016 | Torab Jahromi | H04L 47/17 |
| 2016/0373303 A1 | 12/2016 | Vedam et al. | |
| 2016/0373304 A1 | 12/2016 | Sharma et al. | |
| 2016/0373351 A1 | 12/2016 | Sharma et al. | |
| 2016/0373352 A1 | 12/2016 | Sharma et al. | |
| 2017/0091258 A1* | 3/2017 | Rajahalme | H04L 45/38 |
| 2017/0099224 A1 | 4/2017 | O'Connor et al. | |
| 2017/0118102 A1 | 4/2017 | Majumder et al. | |
| 2017/0187649 A1 | 6/2017 | Chen et al. | |
| 2017/0237632 A1 | 8/2017 | Hegde et al. | |
| 2017/0237633 A1 | 8/2017 | Hegde et al. | |

FOREIGN PATENT DOCUMENTS

| | | |
|---|---|---|
| EP | 3206344 A2 | 8/2017 |
| EP | 3206345 A2 | 8/2017 |
| IE | 20070438 A1 | 2/2008 |
| IN | 201641010295 | 3/2016 |
| IN | 201641016960 | 5/2016 |
| IN | 201641035761 | 10/2016 |
| WO | WO-2010135474 A1 | 11/2010 |
| WO | WO-2015116538 A1 | 8/2015 |
| WO | WO-2015138513 A1 | 9/2015 |

OTHER PUBLICATIONS

Accedian—Solution Brief; FlowBROKER; Feb. 2016; 9 pages.
adaptiv.io and Apsalar Form Strategic Partnership to Provide Omni-channel Mobile Data Intelligence, http://www.businesswire.com/news/home/20150113005721/en/adaptiv.io-Apsala-r-Form-Strategic-Partnership-Provide-Omni-channel, Downloaded circa Mar. 30, 2015, pp. 1-2.
Anjali et al.: MABE: A New Method for Available Bandwidth Estimation in an MPLS Network; submitted to World Scientific on Jun. 5, 2002; 12 pages.
Arista EOS Central—Introduction to TAP aggregation; https://eos.arista.com/introduction-to-tap-aggregation/; Apr. 18, 2017; 6 pages.
Big Tap Monitoring Fabric 4.5; Big Switch Networks; Apr. 2015; 8 pages.
Brocade and IBM Real-Time Network Analysis Solution; 2011 Brocade Communications Systems, Inc.; 2 pages.
Brocade IP Network Leadership Technology; Enabling Non-Stop Networking for Stackable Switches with Hitless Failover; 2010; 3 pages.
Brocade Session Director—Data Sheet; 2016; https://www.brocade.com/content/dam/common/documents/content-types/datash-eet/brocade-session-director-ds.pcif; 5 pages.
Cisco LocalDirector Version 1.6.3 Release Notes, Oct. 1997, Cisco Systems, Inc. Doc No. 78-3880-05.
Cisco Nexus Data Broker: Scalable and Cost-Effective Solution for Network Traffic Visibility; Cisco 2015; 10 pages.
Configuring GTM to determine packet gateway health and availability, https://support.f5.com/kb/en-us/products/big-ip_gtm/manuals/product/gtm-i-mplementations-11-6-0/9.html, downloaded circa Mar. 23, 2015, pp. 1-5.
Delgadillo, "Cisco Distributed Director", White Paper, 1999, at URL:http://www-europe.cisco.warp/public/751/distdir/dd_wp.htm, (19 pages) with Table of Contents for TeleCon (16 pages).
Dosmos DeepFlow: Subscriber Analytics Use Case, http://www.qosmos.com/wp-content/uploads/2014/01/Qosmos-DeepFlow-Analytic- s-use-case-datasheet-Jan-2014.pdf, date Jan. 2014, pp. 1-2.
E.H.T.B. Brands, Flow-Based Monitoring of GTP Trac in Cellular Networks, Date: Jul. 20, 2012, pp. 1-64, University of Twente, Enschede, The Netherlands.
Extended European Search Report & Opinion for EP Application 17000212.5 dated Aug. 1, 2017, 9 pages.
Extended European Search Report & Opinion for EP Application 17000213.3 dated Aug. 1, 2017, 7 pages.
ExtraHop-Arista Persistent Monitoring Architecture for SDN, downloaded circa Apr. 2, 2015, pp. 1-5.
FlexaWare; FlexaMiner Packet Filter FM800PF; Jan. 27, 2017; 5 pages.
"Foundry Networks Announces Application Aware Layer 7 Switching on ServerIron Platform," (Mar. 1999).
Foundry ServerIron Installation and Configuration Guide (May 2000), Chapter 11—Appendix C, http://web.archive.org/web/20000815085849/http://www.foundrynetworks.com/-techdocs/SI/index.html.
Foundry ServerIron Installation and Configuration Guide (May 2000), Chapter 6-10, http://web.archive.org/web/20000815085849/http://www.foundrynetworks.com/-techdocs/SI/index.html.
Foundry ServerIron Installation and Configuration Guide (May 2000), Table of Contents—Chapter 1-5, http://web.archive.org/web/20000815085849/http://www.foundrynetworks.com/-techdocs/SI/index.html.
Gigamon: Active Visibility for Multi-Tiered Security Solutions Overview; 3127-02; Oct. 2014; 5 pages.
Gigamon: Adaptive Packet Filtering; Feature Brief; 3098-03 Apr. 2015; 3 page.
Gigamon Adaptive Packet Filtering; Jan. 25, 2017; 3 pages.
Gigamon: Enabling Network Monitoring at 40Gbps and 100Gbps with Flow Mapping Technology White Paper; 2012; 4 pages.
Gigamon: Enterprise System Reference Architecture for the Visibility Fabric White Paper; 5005-03; Oct. 2014; 13 pages.
Gigamon: Gigamon Intelligent Flow Mapping White Paper; 3039-02; Aug. 2013; 7 pages.
Gigamon: GigaVUE-HB1 Data Sheet; 4011-07; Oct. 2014; 4 pages.
Gigamon Intelligent Flow Mapping—Whitepaper; 3039-04; Apr. 2015; 5 pages.
Gigamon: Maintaining 3G and 4G LTE Quality of Service White Paper; 2012; 4 pages.
Gigamon: Monitoring, Managing, and Securing SDN Deployments White Paper; 3106-01; May 2014; 7 pages.
Gigamon: Netflow Generation Feature Brief; 3099-04; Oct. 2014; 2 pages.
Gigamon: Service Provider System Reference Architecture for the Visibility Fabric White Paper; 5004-01; Mar. 2014; 11 pages.
Gigamon: The Visibility Fabric Architecture—A New Approach to Traffic Visibility White Paper; 2012-2013; 8 pages.
Gigamon: Unified Visibility Fabric; https://www.gigamon.com/unfied-visibility-fabric; Apr. 7, 2015; 5 pages.
Gigamon: Unified Visibility Fabric Solution Brief; 3018-03; Jan. 2015; 4 pages.

(56) References Cited

OTHER PUBLICATIONS

Gigamon: Unified Visibility Fabric—A New Approach to Visibility White Paper; 3072-04; Jan. 2015; 6 pages.
Gigamon: Visibility Fabric Architecture Solution Brief; 2012-2013; 2 pages.
Gigamon: Visibility Fabric; More than Tap and Aggregation.bmp; Sep. 2014; https://www.youtube.com/watch?v=Rb5-3To6AF0, 1 page.
Gigamon: Vistapointe Technology Solution Brief; Visualize-Optimize-Monetize-3100-02; Feb. 2014; 2 pages.
GigaVUE-2404 // Data Sheet, www.gigamon.com, date Feb. 2014, pp. 1-6.
GigaVUE-VM // Data Sheet, www.gigamon.com, date Oct. 2014, pp. 1-3.
GL Communications Inc.; PacketBroker—Passive Ethernet Tap; Jan. 27, 2017; 2 pages.
IBM User Guide, Version 2.1AIX, Solaris and Windows NT, Third Edition (Mar. 1999) 102 Pages.
International Search Report & Written Opinion for PCT Application PCT/US2017/025998 dated Jul. 20, 2017, Israel Patent Office, Jerusalem, 7 pages.
International Search Report and Written Opinion for PCT Application No. PCT/US2015/012915 dated Apr. 10, 2015, European Patent Office, HV Rijswijk, 14 pages.
Ixia & VECTRA, Complete Visibility for a Stronger Advanced Persistent Threat (APT) Defense, pp. 1-2, May 30, 2016, [retrieved on Jul. 12, 2017]. Retrieved from the Internet: (<url: https:=""< a="" href="http://www.ixiacom.com/sites/">www.ixiacom.com/sites/</url:>default/files/2016-07/915-6976-01-Vectra-Ixia.pdf).
Ixia Anne GTP Session Controller; Solution Brief; 915-6606-01 Rev. A, Sep. 2013; 2 pages.
Ixia: Creating a Visibility Architecture—a New Perspective on Network Visibilty White Paper; 915-6581-01 Rev. A, Feb. 2014; 14 pages.
Ixia White Paper; The Real Secret to Securing Your Network; Oct. 2014; 16 pages.
Ixia—Evaluating Inline Security Fabric: Key Considerations; White Paper; https://www.ixiacom.com/sites/default/files/2016-08/915-8079-01-S-WP-Eval-uating%20Inline%20Security%20Fabric_v5.pdf; 10 pages.
Joshi et al.: A Review of Network Traffic Analysis and Prediction Techniques; arxiv.org; 2015; 22 pages.
Krishnan et al.: "Mechanisms for Optimizing LAG/ECMP Component Link Utilization in Networks", Oct. 7, 2014, 27 pages, https://tools.ietf.org/html/draft-ietf-opsawg-large-flow-load-balancing-15.
Netscout; Comprehensive Core-to-Access IP Session Analysis for GPRS and UMTS Networks; Technical Brief; Jul. 16, 2010; 6 pages.
Netscout: nGenius Subscriber Intelligence; Data Sheet; SPDS_001-12; 2012; 6 pages.
Network Analytics: Product Overview, www.sandvine.com, date Apr. 28, 2014, pp. 1-2.
Network Time Machine for Service Providers; NETSCOUT; http://enterprise.netscout.com/telecom-tools/lte-solutions/network-time-m-achine-service-providers; Apr. 18, 2017; 8 pages.
Next-Generation Monitoring Fabrics for Mobile Networks; Big Switch Networks—White Paper; 2014; 9 pages.
NGenius Performance Manager, www.netscout.com, date Mar. 2014, pp. 1-8.
NGenius Subscriber Intelligence, http://www.netscout.com/uploads/2015/03NetScout_DS_Subscriber_Intelligenc-e_SP.pdf, downloaded circa Mar. 23, 2015, pp. 1-6.
Ntop: Monitoring Mobile Networks (2G, 3G and LTE) using nProbe; http://www.ntop.org/nprobe/monitoring-mobile-networks-2g-3g-and-lte-using- -nprobe; Apr. 2, 2015; 4 pages.
PCT Patent Application No. PCT/US2015/012915 filed on Jan. 26, 2015 by Hsu et al.
Real-time Data Analytics with IBM InfoSphere Streams and Brocade MLXe Series Devices, www.brocade.com, date 2011, pp. 1-2.
Stateful GTP Correlation, https://www.gigamon.com/PDF/appnote/AN-GTP-Correlation-Stateful-Subscriber-Aware-Filtering-4025.pdf, date 2013, pp. 1-9.
Syniverse Proactive Roaming Data Analysis—VisProactive, http://m.syniverse.com/files/service_solutions/pdf/solutionsheet_visproactive_314.pdf, date 2014, pp. 1-3.
Unified Visibility Fabric an Innovative Approach, https://www.gigamon.com/unified-visibility-fabric, Downloaded circa Mar. 30, 2015, pp. 1-4.
U.S. Appl. No. 09/459,815, filed Dec. 13, 1999 by Skene et al.
U.S. Appl. No. 14/848,586, filed Sep. 9, 2015 by Chen et al.
U.S. Appl. No. 14/848,645, filed Sep. 9, 2015 by Chen et al.
U.S. Appl. No. 14/927,478, filed Oct. 30, 2015 by Vedam et al.
U.S. Appl. No. 14/927,479, filed Oct. 30, 2015 by Sharma et al.
U.S. Appl. No. 14/927,482, filed Oct. 30, 2015 by Sharma et al.
U.S. Appl. No. 14/927,484, filed Oct. 30, 2015 by Sharma et al.
U.S. Appl. No. 15/205,889, filed Jul. 8, 2016 by Hegde et al. (Unpublished).
U.S. Appl. No. 15/336,333, filed Oct. 27, 2016 by Vedam et al. (Unpublished.).
U.S. Appl. No. 15/425,777, filed Feb. 6, 2017, by Chen et al. (Published.).
U.S. Appl. No. 15/466,732, filed Mar. 22, 2017 by Hegde et al. (Unpublished.).
U.S. Appl. No. 15/467,766, filed Mar. 23, 2017 by Nagaraj et al. (Unpublished.).
U.S. Appl. No. 60/169,502, filed Dec. 7, 2009 by Yeejang James Lin.
U.S. Appl. No. 60/182,812, filed Feb. 16, 2000 by Skene et al.
U.S. Appl. No. 60/998,410, filed Oct. 9, 2007 by Wang et al.
U.S. Appl. No. 61/919,244, filed Dec. 20, 2013 by Chen et al.
U.S. Appl. No. 61/932,650, filed Jan. 28, 2014 by Munshi et al.
U.S. Appl. No. 61/994,693, filed May 16, 2014 by Munshi et al.
U.S. Appl. No. 62/088,434, filed Dec. 5, 2014 by Hsu et al.
U.S. Appl. No. 62/137,073, filed Mar. 23, 2015 by Chen et al.
U.S. Appl. No. 62/137,084, filed Mar. 23, 2015 by Chen et al.
U.S. Appl. No. 62/137,096, filed Mar. 23, 2015 by Laxman et al.
U.S. Appl. No. 62/137,106, filed Mar. 23, 2015 by Laxman et al.
VB220 Modular 10G.1G Network Packet Broker Datasheet; VSS Monitoring; 2016; 8 pages.
VB220-240G Modular 10G/1G Network Packet Broker; VSS Monitoring; 2016, 3 pages.
White Paper, Foundry Networks, "Server Load Balancing in Today's Web-Enabled Enterprises" Apr. 2002 10 Pages.
Xu et al.: Cellular Data Network Infrastructure Characterization and Implication on Mobile Content Placement, Sigmetrics '11 Proceedings of the ACM Sigmetrics joint international conference on Measurement and modeling of computer systems, date Jun. 7-11, 2011, pp. 1-12, ISBN: 978-1-4503-0814-4 ACM New York, NY, USA copyright 2011.

* cited by examiner

TRAFFIC DEDUPLICATION IN A VISIBILITY NETWORK

CROSS-REFERENCES TO RELATED APPLICATIONS

The present application claims the benefit and priority of India Provisional Application No. 201641005019, filed Feb. 12, 2016, entitled "SCALABLE NETWORK VISIBILITY ARCHITECTURE." In addition, the present application is related to commonly-owned U.S. patent application Ser. No. 15/205,889, filed concurrently with the present application, entitled "SOFTWARE-BASED PACKET BROKER." The entire contents of these applications are incorporated herein by reference in their entireties for all purposes.

BACKGROUND

As known in the field of computer networking, a visibility network (sometimes referred to as a visibility fabric) is a type of network that facilitates the monitoring and analysis of traffic flowing through another network (referred to herein as a "core" network). The purposes of deploying a visibility network are varied and can include management/optimization of the core network, security monitoring of the core network, business intelligence/reporting, compliance validation, and so on.

FIG. 1 depicts an example visibility network 100 according to an embodiment. As shown, visibility network 100 includes a number of taps 102 that are deployed within a core network 104. Taps 102 are configured to replicate data and control traffic that is exchanged between network elements in core network 104 and forward the replicated traffic to a packet broker 106 (note that, in addition to or in lieu of taps 102, one or more routers or switches in core network 104 can be tasked to replicate and forward data/control traffic to packet broker 106 using their respective SPAN or mirror functions). Packet broker 106 can perform various packet processing functions on the traffic received from taps 102, such as removing protocol headers, filtering/classifying packets based on configured rules, and so on. Packet broker 106 can then transmit the processed traffic to a number of analytic probes/tools 108, which can carry out various types of calculations and analyses on the traffic in accordance with the business goals/purposes of visibility network 100 (e.g., calculation of key performance indicators (KPIs), detection of security threats/attacks in core network 104, generation of reports, etc.).

Generally speaking, existing visibility network implementations use dedicated networking hardware (e.g., hardware comprising custom application-specific integrated circuits (ASICs) and/or field-programmable gate arrays (FPGAs)) in order to implement packet broker 106. For instance, according to one known approach, packet broker 106 can be implemented using a network router comprising a number of line cards, where each line card includes an ASIC or FPGA-based packet processor. When the router receives replicated traffic from taps 102, the router processes the traffic using the packet processors based on rules that are programmed into hardware memory tables (e.g., content-addressable memory (CAM) tables) resident on the packet processors and/or line cards. The router then forwards the processed traffic onward to probes/tools 108 for analysis.

While this hardware-based approach for implementing packet broker 106 has certain benefits (e.g., it can process traffic with minimal latency and jitter), it also suffers from several drawbacks. First, the scalability of visibility network 100—in other words, its ability to process increasing volumes of traffic from core network 104—is necessarily constrained by the hardware capabilities of packet broker 106. For example, if packet broker 106 is implemented using a chassis-based router that supports up to X line cards, packet broker 106 cannot scale to support traffic volumes that exceed the capabilities of those X line cards. If such scaling is required, the entire router must be replaced with another router with that supports more, or higher capability, line card hardware.

Second, since hardware-based packet brokers perform packet processing based on rules that are programmed into hardware memory tables, these packet brokers are generally limited to executing packet processing operations that conform to the semantics of such rules (i.e., attempt to match one or more header fields of an incoming packet and then perform a specified action if a match is made). While these operations can be chained by passing the output of one packet processor/line card to another, the order of the chaining is fixed in hardware. This rigid processing paradigm is problematic if more flexible, complex, and dynamic packet processing operations are desired.

Third, implementing feature changes or additions to a hardware-based packet broker can be costly and time-consuming due to the need to design and validate such changes at the hardware level. This, in turn, makes it more difficult to quickly iterate the packet broker in response to evolving customer needs/requirements and increases the cost of the device for those customers.

SUMMARY

Techniques for implementing traffic deduplication in a visibility network are provided. According to one embodiment, a packet broker of the visibility network can receive a control or data packet replicated from a core network. The packet broker can then apply a first stage deduplication process in which the packet broker attempts to deduplicate the control or data packet based on one or more interfaces of the core network from which the control or data packet originated, and apply a second stage deduplication process in which the packet broker attempts to deduplicate the control or data packet based on the content (e.g., payload) of the control or data packet.

The following detailed description and accompanying drawings provide a better understanding of the nature and advantages of particular embodiments.

DETAILED DESCRIPTION

Figure 1:
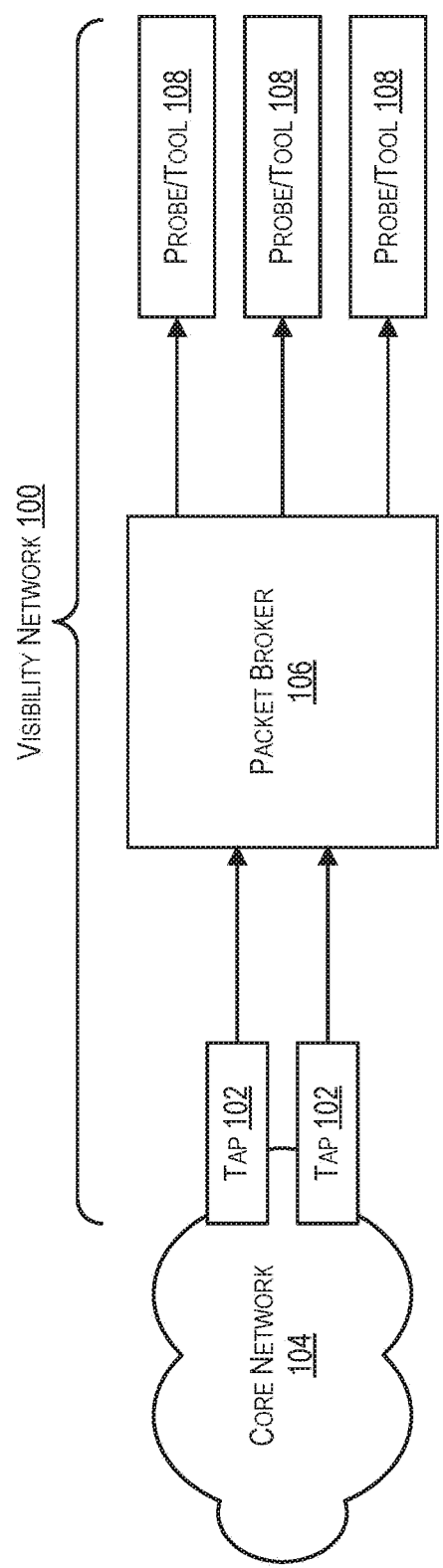
FIG. 1 depicts an example visibility network.

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

1. Overview

Embodiments of the present disclosure provide techniques for implementing a software-based packet broker in a visibility network. In various embodiments, this software-based packet broker comprises two components: (1) a basic packet broker, or "BPB," which may be a hardware (i.e., ASIC/FPGA-based) network switch or router, and (2) a cluster of one or more general purpose computer systems, referred to herein as a "session director" cluster.

At a high level, the BPB can receive data and control traffic that is replicated from a core network and can forward the data traffic in a load balanced manner to the systems, or "nodes," in the session director cluster (note that control traffic can be forwarded to all nodes, which is explained below). In response, the session director nodes can perform, in software, packet processing operations on the received traffic, determine egress ports of the BPB on which the traffic should be sent out, tag the traffic with this egress port information, and then send the tagged traffic back to the BPB. Finally, the BPB can forward the traffic out of its appropriate egress ports (per the tags added by the session director nodes) towards one or more analytic probes/tools.

With the general architecture described above, a number of advantages can be realized over conventional hardware-based packet broker solutions. First, since most of the packet processing functions of the packet broker are performed in a distributed and load balanced manner across the nodes of the session director cluster, the software-based packet broker of the present disclosure can be easily scaled as the volume of data traffic generated by the core network increases. For example, if more resources are required to handle a higher volume of data traffic, additional nodes can be added to the session director cluster. This is in contrast to a hardware-based packet broker device such as a router, which must be replaced in its entirely if the amount of data traffic generated in the core network grows to exceed the router's hardware capabilities. The distributed nature of the session director cluster also allows for fault tolerance (i.e., failover of work from one session director node to another) in the case of a node crash or failure.

Second, since the packet processing performed at each session director node is executed in software (i.e., by one or more general purpose processing cores) rather than in hardware (i.e., by a dedicated ASIC/FPGA using rules programmed in a CAM table), the session director cluster can implement more flexible, dynamic, and complex packet processing operations than possible via conventional, CAM-based packet matching and processing. For example, in one embodiment, the session director cluster can correlate related packets across multiple different types of network protocols. As another example, the session director cluster can filter/forward packets based on deeply embedded packet data rather than simply header fields, and can support user-defined cascading and/or prioritization of filtering and forwarding policies. As yet another example, the session director cluster can implement sophisticated deduplication of traffic in order to prevent duplicate packets from reaching the analytic probes/tools. In certain embodiments, the general purpose processing cores of each session director node can be dynamically assigned to handle these various packet processing operations in a manner that optimizes use of the node's compute resources based on need/scale requirements.

Third, due to the software-based nature of the session director cluster, its feature set can be developed and enhanced more quickly and in a more cost-efficient manner than hardware-based solutions. This allows system vendors to rapidly iterate the packet broker in response to bugs or feature requests and provide greater value (in the form of, e.g., a reduced price) to customers. The BPB, which is the only piece of dedicated hardware in the packet broker, can be relatively simple in design and generally will not need to be modified in order to accommodate changes to the packet processing functions performed by the session director cluster.

2. Software-Based Packet Broker Architecture

Figure 2:
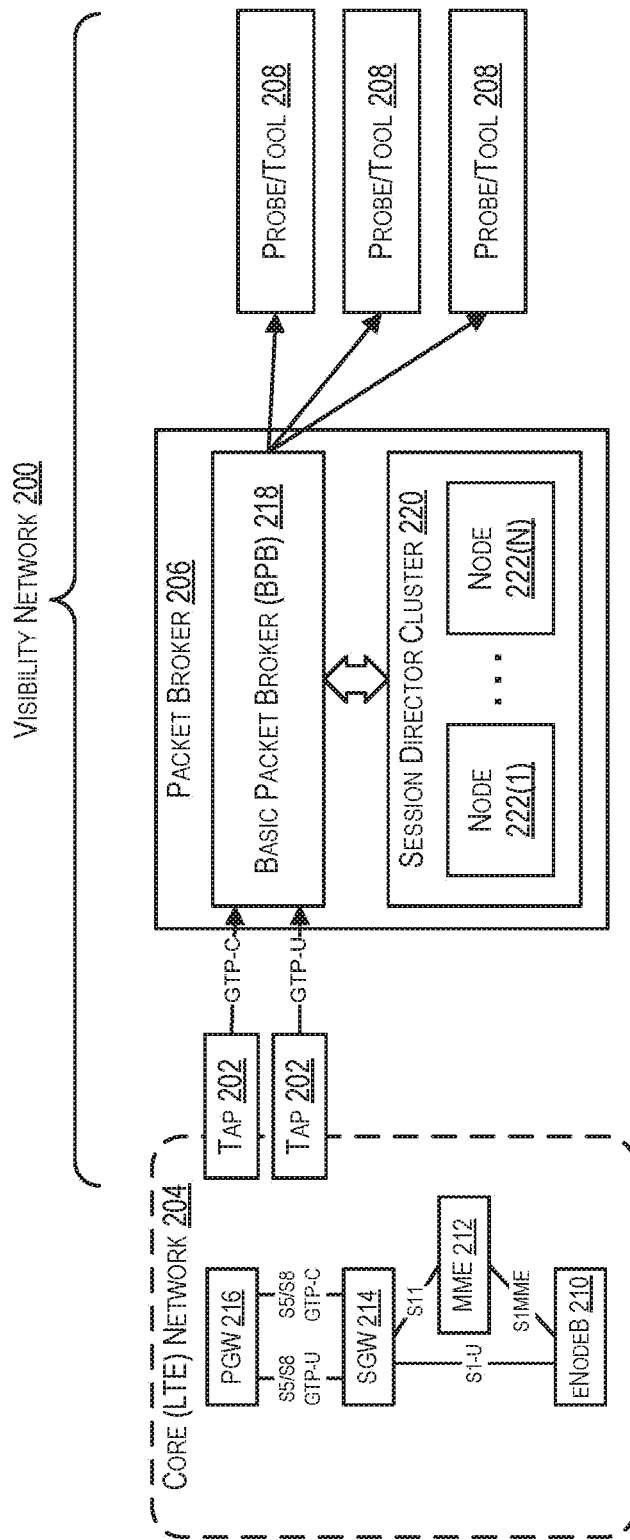
FIG. 2 depicts a visibility network comprising a software-based packet broker according to an embodiment.

FIG. 2 depicts an example visibility network 200 that incorporates a software-based packet broker according to an embodiment of the present disclosure. As shown, visibility network 200 includes a number of taps 202 that are deployed in a core network 204 and are configured to replicate data and control traffic exchanged in network 204 to a packet broker 206. In FIG. 2, core network 204 is a mobile LTE network that comprises network elements specific to this type of network, such as an eNodeB 210, a mobility management entity (MME) 212, a serving gateway (SGW) 214, and a packet data network gateway (PGW) 216 which connects to an external packet data network such as the Internet. Further, in this particular example, taps 202 are configured to replicate and forward GPRS Tunneling Protocol control (GTP-C) traffic exchanged on an S11 interface between MME 212 and SGW 214 to packet broker 206, and replicate/forward GTP data (GTP-U) traffic exchanged on an S1U interface between eNodeB 210 and SGW 214 to packet broker 206. However, it should be appreciated that core network 204 can be any other type of computer network known in the art, such as a mobile 3G network, a landline local area network (LAN) or wide area network (WAN), etc.

Upon receiving the replicated data and control traffic via taps 202, packet broker 206 can perform various types of packet processing functions on the traffic (as configured/assigned by an operator of visibility network 200) and can forward the processed traffic to one or more probes/tools 208 for analysis.

As noted in the Background section, conventional packet brokers are generally implemented using dedicated networking hardware, such as a network switch or router. These hardware-based packet brokers rely on ASIC or FPGA-based packet processors to execute their assigned packet processing functions based on rules that are programmed into hardware memory tables (e.g., CAM tables) resident on the packet processors and/or line cards of the devices. While this hardware-based approach is functional, it also suffers from drawbacks such as poor scalability, inability to support flexible/dynamic/complex packet processing rules and operations, and high development cost and effort.

To address the foregoing and other related issues, packet broker 206 of FIG. 2 implements a novel, software based architecture that comprises a basic packet broker (BPB) 218 and a session director cluster 220 (including nodes 222(1)-222(N)). BPB 218 can be implemented using a dedicated network switch or router, while each node 222 of session director cluster 220 can be implemented using a general purpose computer system (either physical or virtual), such as an x86-based system/blade/device. In operation, BPB 218 can receive the data and control traffic that is replicated from core network 204 via taps 202. However, rather than processing this traffic in hardware as in the case of prior art hardware-based packet brokers, BPB 218 can forward the traffic to session director cluster 220. In certain embodiments, BPB 218 can forward control traffic to every node 222 of cluster 220, while distributing data traffic in a load balanced manner across nodes 222 of cluster 220. Upon receiving the data/control traffic, each node 222 can execute, in software, appropriate packet processing functions on the traffic (e.g., rule generation, correlation, filtering, etc.), determine egress ports of BPB 218 on which the traffic should be sent out, tag the traffic with this egress port information, and send the tagged traffic back to the BPB 218. BPB 218 can then forward the traffic out of its appropriate egress ports (per the tags added by nodes 222) towards analytic probes/tools 208. With this architecture, session director cluster 220 can be understood as a software-based extension of BPB 218 that offloads the majority of the packet processing functions of packet broker 206 from hardware to software. This allows packet broker 206 to achieve better scalability and feature flexibility, and require less development cost/effort, than conventional hardware-based solutions. Additional details regarding the design and operation of software-based packet broker 206 are provided in the sections that follow.

It should be appreciated that FIG. 2 is illustrative and not intended to limit embodiments of the present disclosure. For example, the various entities shown in FIG. 2 may be arranged according to different configurations and/or include subcomponents or functions that are not specifically described. One of ordinary skill in the art will recognize other variations, modifications, and alternatives.

3. Packet Processing Workflows

Figure 3A:
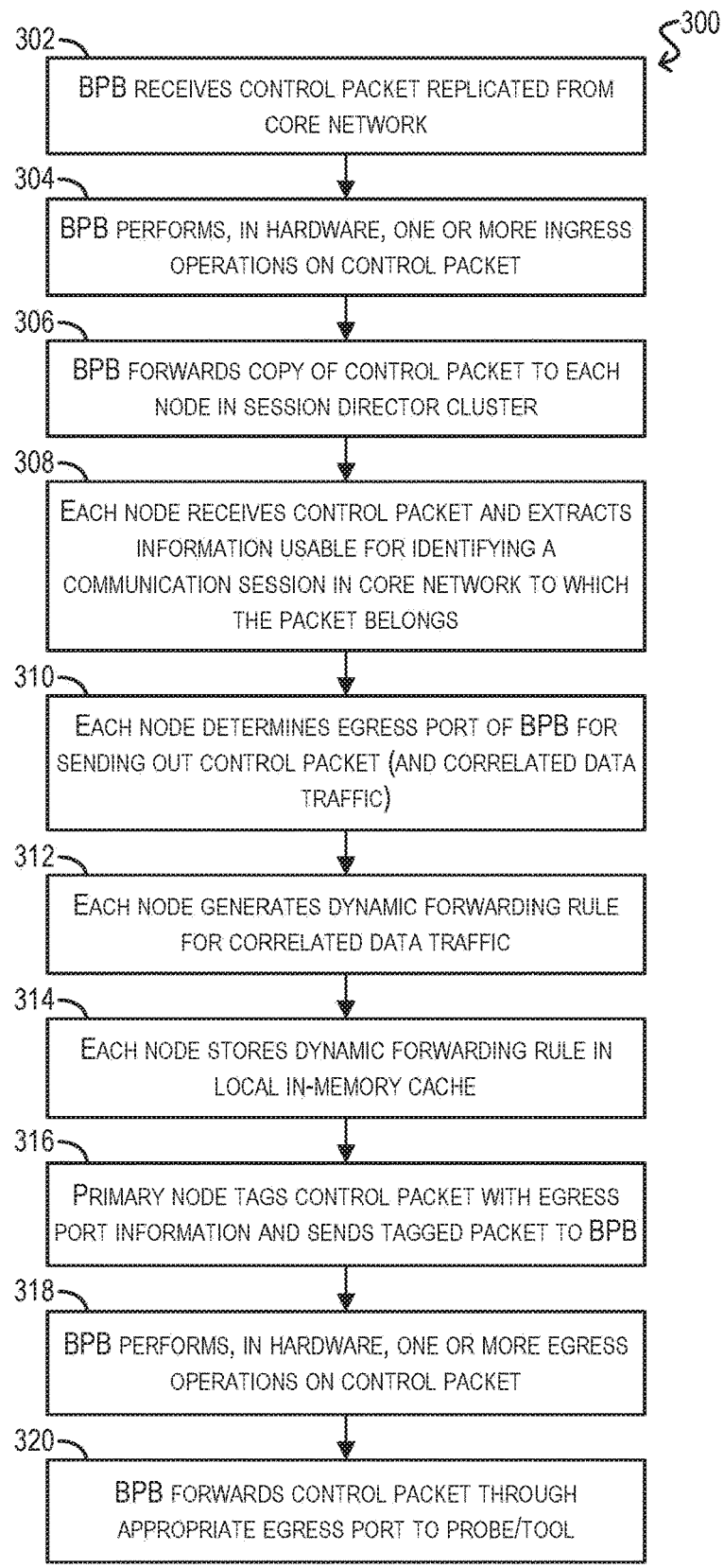
FIGS. 3A and 3B depicts workflows that can be executed by the software-based packet broker of FIG. 2 for processing control and data traffic replicated from a core network, according to an embodiment.
Figure 3B:
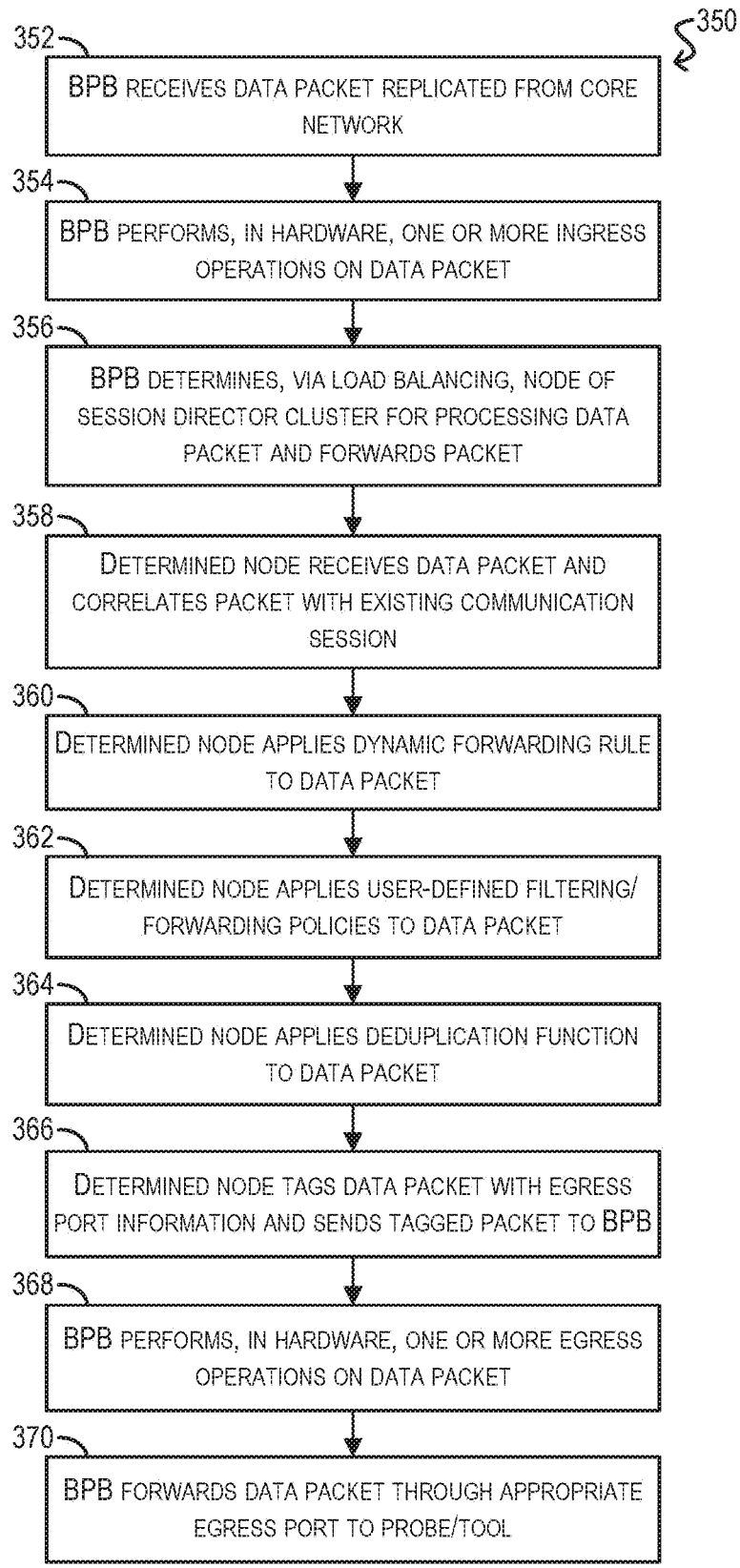

FIGS. 3A and 3B depict high-level workflows 300 and 350 that may be executed by software-based packet broker 206 of FIG. 2 for processing replicated traffic received from core network 204 according to an embodiment. In particular, workflow 300 corresponds to a workflow for processing control traffic and workflow 350 corresponds to a workflow for processing data traffic. Although shown in separate figures for ease of explanation, workflows 300 and 350 will generally be executed concurrently by packet broker 206.

Starting with block 302 of FIG. 3A, BPB 218 can receive a control packet that is replicated from core network 204 via. e.g., a tap 202. In embodiments where core network 204 is a mobile network (as in FIG. 2), the control packet may be a GTP-C or Radius protocol packet. In other embodiments, the control packet may be any other type of control/signaling protocol packet used in core network 204.

At block 304, BPB 218 can optionally perform, in hardware, one or more ingress operations on the control packet received at block 302. These ingress operations can include, e.g., timestamping the packet, tagging the packet with ingress port information, stripping one or more protocol headers (e.g., MPLS, NVGRE, VXLAN, etc.), and so on. Generally speaking, the nature of these ingress operations will vary depending on the configuration and intended use cases for visibility network 200. Once these operations have been completed, BPB 218 can forward a copy of the control packet to each node 222 of session director cluster 220 (block 306).

At block 308, each session director node 222 can receive the control packet and extract information from it that is usable for identifying a communication session or flow within core network 204 to which the control packet belongs. For example, in the case where core network 204 is an LTE network and the control packet is a GTP-C packet, each session director node 222 can extract mobile-specific parameters such as IMSI (International Mobile Subscriber Identity), TEID (tunnel end point identifier), APN (access point name), user equipment (UE) IP address, and/or others that identify a particular mobile user (i.e., subscriber) session on the LTE network.

Each session director node 222 can then determine an egress port of BPB 218 for sending out control and data traffic associated with the communication session identified at block 308 (block 310). This step can comprise, e.g., referencing a "load balance table" maintained in a local in-memory cache of node 222 that includes mappings between session identifiers (e.g., IMSI) and the egress ports of BPB 218, and assigning to the communication session the egress port mapped in the load balance table. The mappings in the table can be defined in such a way that the control/data traffic for the various communication sessions in core network 204 are load balanced across the egress ports of BPB 218 (and thus, analytic probes/tools 208).

Upon determining the egress port for the communication session, each session director node 222 can generate a dynamic forwarding rule for sending out data traffic that is part of the same session (i.e., "correlated" data traffic) on that port (block 312). For instance, if node 222 determined at block 310 that the egress port for the communication session should be port 2/1 of BPB 218, node 222 can generate a dynamic forwarding rule for sending out all data traffic with, e.g., the same IMSI, TEID, APN, and/or other session parameters on the same port 2/1. In this way, node 222 can direct correlated control and data traffic to the same analytic probe/tool 208. This dynamically generated forwarding rule can be stored in the local in-memory cache of the node (block 314).

A designated node of the session director cluster (referred to herein as the "primary" node) can then tag the control packet with information identifying the egress port determined at block 310 and send the tagged packet back to BPB 218 (block 316). In certain embodiments, multiple such primary nodes may be configured. Upon receiving the tagged control packet, BPB 218 can optionally perform, in hardware, one or more egress operations on the packet (e.g., stripping the egress port tag, applying an egress filter, etc.) (block 318). Finally, at block 320, BPB 218 can forward the control packet onward through the egress port identified in the tag to an analytic probe/tool 208.

Turning now to workflow 350 of FIG. 3B, at block 352, BPB 218 can receive a data packet that is replicated from core network 204 via, e.g., a tap 202. In embodiments where core network 204 is a mobile network (as in FIG. 2), the data packet may be a GTP-U or SGi packet. In other embodiments, the data packet may be any other type of data packet used in core network 204.

At block 354, BPB 218 can optionally perform, in hardware, one or more ingress operations on the data packet received at block 352. These ingress operations can include, e.g., timestamping the packet, tagging the packet with ingress port information, stripping one or more protocol headers (e.g., MPLS, NVGRE, VXLAN, etc.), and so on. Like the operations performed at block 304 of workflow 300, the nature of these ingress operations can vary depending on the configuration and intended use cases for visibility network 200.

Once the ingress operations at block 354 have been completed, BPB 218 can load balance the data packet across the nodes of the session director cluster and thereby determine a particular node 222(X) of session director cluster 220 that should process the data packet (block 356). This load balancing can be of any type (e.g., round-robin, weighted round-robin, etc.) and based on any parameters within the packet (e.g., GTP TEID, inner IP address(es), etc.). In this way, BPB 218 can effectively distribute the processing of data traffic across the nodes of session director cluster 220. Generally speaking, this load balancing is not state oriented and instead is based on a preconfigured load balancing algorithm. BPB 218 can then forward the data packet to the determined session director mode 222(X).

At block 358, session director node 222(X) can receive the data packet and correlate the data packet with a particular communication session entry maintained in the node's local in-memory cache. In addition, if a dynamic forwarding rule for the session has been created per block 312 of workflow 300, session director node 222(X) apply the dynamic forwarding rule to the data packet in order to determine an egress port of BPB 218 for sending out the packet (block 360). If no dynamic forwarding rule exists yet, node 222(X) can assign some default egress port to the data packet (e.g., a port that is statically mapped to one or more header fields of the packet).

Upon applying the dynamic forwarding rule, session director node 222(X) can further apply one or more user-defined filtering or forwarding policies to the data packet (block 362). These user-defined filtering and forwarding policies can, e.g., drop certain data packets based on various parameters, such as IMSI, APN, eNodeB, etc. Alternatively (or in addition), these user-defined filtering and forwarding rules can change the egress port that is assigned to the data packet. For example, the operator of visibility network 200 may define a rule that forwards all data traffic for a particular range of IMSIs to a particular egress port. In certain embodiments, these filtering and forwarding policies can be dynamically cascaded in an order that is based on user-defined priorities.

Then, at block 364, session director node 222(X) can apply a deduplication function on the data packet. This deduplication function, which is described in further detail in Section 5.F below, can filter out the packet if it is determined to be a duplicate of another packet that has already been sent to analytic probes/tools 208.

At the conclusion of the deduplication process, session director node 222(X) can tag the data packet with information identifying the egress port for the packet (as determined via the processing in the previous steps) and send the tagged packet back to BPB 218 (block 366). Upon receiving the tagged data packet, BPB 218 can optionally perform, in hardware, one or more egress operations on the packet (e.g., stripping the egress port tag, applying an egress filter, etc.) (block 368). Finally, at block 370, BPB 218 can forward the data packet onward through the egress port identified in the tag to an analytic probe/tool 208.

4. Hardware Architecture of BPB

Figure 4:
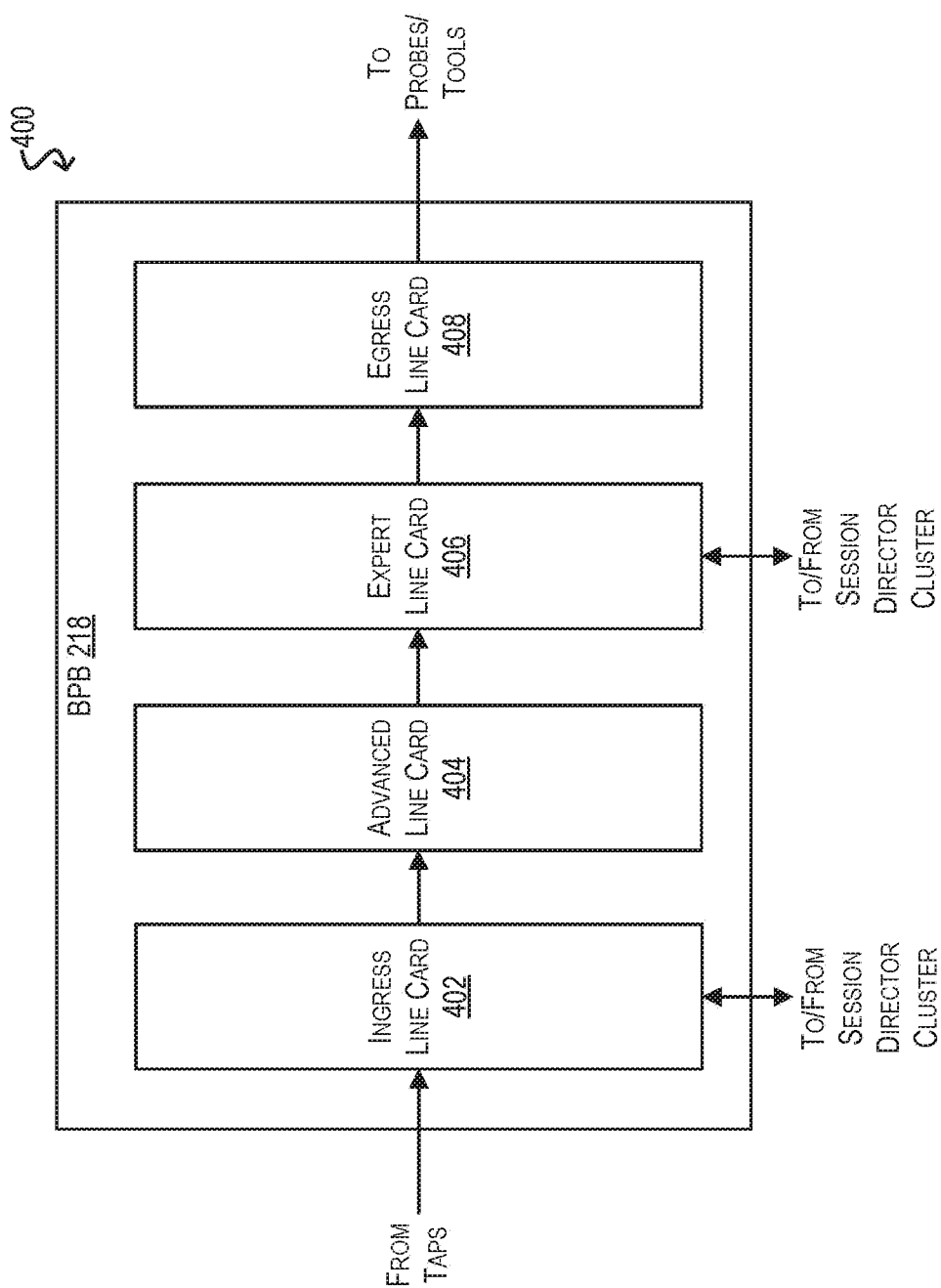
FIG. 4 is a simplified block diagram of the hardware architecture of a basic packet broker according to an embodiment.

FIG. 4 is a simplified block diagram depicting an example hardware architecture 400 for BPB 218 of FIG. 2 according to an embodiment. This architecture clarifies how the functions/operations attributed to BPB 218 in workflows 300 and 350 may map to the hardware of the device. As shown in FIG. 4, architecture 400 includes an ingress line card 402, an "advanced" line card 404, an "expert" line card 406, and an egress line card 408.

In various embodiments, ingress line card 402 is configured to interface with taps 202 in core network 204, receive replicated control/data traffic from taps 202 on one or more ingress ports, and apply the ingress operations described with respect to blocks 304 and 354 of workflows 300 and 350 respectively. Ingress line card 402 can also flood the control traffic that it receives to nodes 222 of session director cluster 220.

Advanced line card 404 is configured to load balance data traffic that is received at ingress line card 402 across nodes 222 of session director cluster 220 (per block 356 of workflow 350). As mentioned previously, this load balancing can be performed based on a predefined tuple of header fields in the data traffic, TEID, and/or other criteria. In certain embodiments, advanced line card 404 can also perform other packet processing functions depending on the nature of the data traffic, such as packet slicing or applying one or more filters.

Expert line card 406 is configured to interface with session director cluster 220 and forward the data traffic that has been load balanced by advanced line card 404 to the appropriate nodes of cluster 220 for software-based processing. Once the nodes have completed their operations, expert line card 406 can receive the processed traffic back from the cluster and pass it to egress line card 408.

Egress line card 408 is configured to extract the egress port information included in the processed traffic and apply the egress operations described with respect to blocks 318 and 368 of workflows 300 and 350 respectively. Finally, egress line card 408 can forward the traffic through appropriate egress ports (as determined by the extracted egress port information) to analytic probes/tools 208.

It should be appreciated that hardware architecture 400 of FIG. 4 is illustrative and various modifications are possible. For example, while BPB 218 is shown as comprising one of each type of line card (i.e., ingress, advanced, expert, egress), in practice there can be multiple line cards of each type depending on the capacity needed. Further, the functions attributed to each line card type may be consolidated into fewer line card types, or spread out across additional line card types. Yet further, the various line cards shown in FIG. 4 may implement other functions not specifically described. One of ordinary skill in the art will recognize many variations, modifications, and alternatives.

5. Software Architecture of Session Director Node

Figure 5:
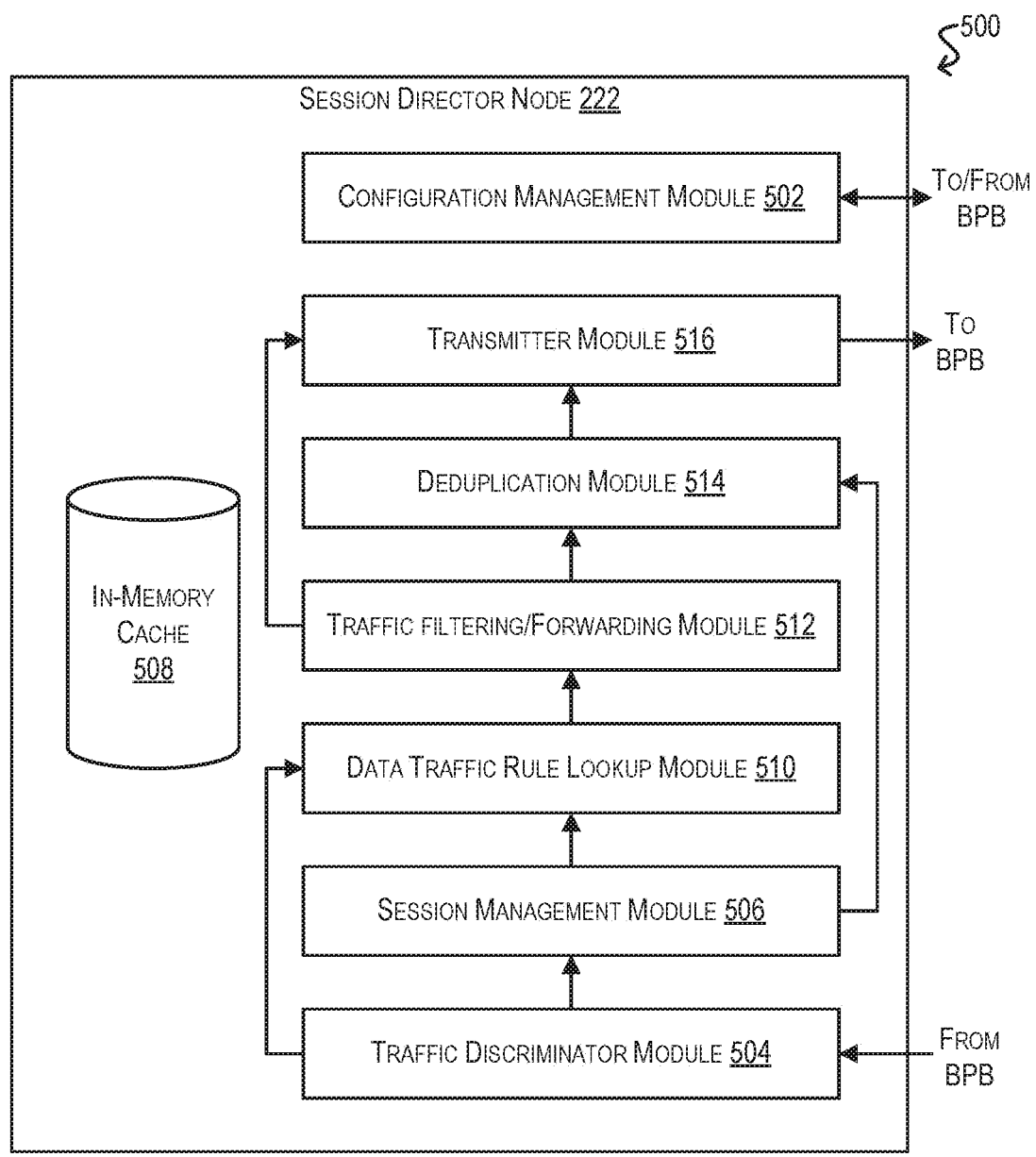
FIG. 5 is a simplified block diagram of the software architecture of a session director node according to an embodiment.

FIG. 5 is a simplified block diagram illustrating an example software architecture 500 of each node 222 of session director cluster 220 according to an embodiment. This architecture clarifies how the functions/operations attributed to session director cluster 220 in workflows 300 and 350 may map to the software running on each node. As shown in FIG. 5, architecture 500 includes a configuration management module 502, a traffic discriminator module 504, a session management module 506, an in-memory cache 508, a data traffic rule lookup module 510, a traffic filtering/forwarding module 512, a deduplication module 514, and a transmitter module 516. Each of these modules are discussed in turn in the subsections that follow.

It should be noted that, in certain embodiments, session director node 222 can dynamically assign its general purpose processing cores to execute modules 502, 504, 506, 510, 512, 514, and 516 in a manner that optimizes usage of those processing cores. For example, if node 222 determines that a relatively large amount of computing power is needed to execute the filtering and forwarding performed by traffic filtering/forwarding module 512 (due to, e.g., a large influx of data traffic), node 222 can assign more processing cores to this module. Conversely, if node 222 determines that less computing power is needed to execute the functionality of session management module 506 (due to, e.g., a relatively small amount of incoming control traffic), node 222 can assign fewer processing cores to this module. In this way, session director node 222 can dynamically load balance the processing of modules 502, 504, 506, 510, 512, 514, and 516 across its local compute resources on an as-needed basis.

Further, it should be appreciated that the functional boundaries between modules 502, 504, 506, 510, 512, 514, and 516 are flexible. For example, the processing attributed to one module can be subsumed by another module, modules can be merged or split, and so on. In addition, software architecture 500 is highly dynamic/configurable and other modules that perform other functions can be added as needed. For instance, in one embodiment, a packet sampling module may be added to sample in (i.e., allow) or sample out (i.e., discard) some portion of the data and/or control traffic. This sampling can be implemented with session and state tracking and can be performed based on a combination of one or more filters such as IMSI, IMEI, RAT type, user location, etc. (e.g., sample out 20% of IMSIs if device IMEIs are in range xxx to yyy at location LAC=abc or RAC=xyz). In another embodiment, a packet masking module may be added to enable customers to hide specific information that appears in the data/control traffic (e.g., credit card information or username in a specific protocol). With this module, a user can configure a packet offset at which a mask should be applied and a mask value. The user can then configure various match parameters to select a specific traffic stream and apply the mask value at the specified offset for that stream. Note that there are no restrictions regarding where the offset may be in the packet. In yet another embodiment, an IMSI limiting module may be added that allows a user to limit the number of IMSIs that are allowed to be sent to a specific egress port of the BPB. One of ordinary skill in the art will recognize many variations, modifications, and alternatives for the configuration of software architecture 500.

5.A Configuration Management

Configuration management module 502 acts as an interface between session director node 222 and BPB 218 for exchanging information regarding their respective configurations. For example, in one embodiment, configuration management module 502 can receive from BPB 218 (via a management protocol like Simple Network Management Protocol (SNMP)) information regarding the ingress ports and egress ports configured on BPB 218, such as port IDs and total number of ports. Session director node 222 can then use this information to create the load balance table described previously for defining initial load-balanced mappings between session identifiers and egress ports.

Configuration management module 502 can also expose a user interface (e.g., a command line or graphical interface) that allows users to enter various types of configuration information on session director node 222. This configuration information can include, e.g., session identifier information for facilitating generation of the load balance table, as well as user-defined filtering and forwarding policies which are discussed with respect to traffic filtering/forwarding module 512 below.

5.B Traffic Discriminator

Traffic discriminator module 504 is responsible for (1) ingesting the control and data traffic that is replicated from core network 204 and forwarded by BPB 218, (2) determining the type of each ingested packet (e.g., whether it is a GTP-C packet, Radius packet, GTP-U packet, SGi packet, etc.), and (3) passing the packet to an appropriate downstream module in architecture 500 based on its determined type. For example, in one set of embodiments, if traffic discriminator module 504 determines that the ingested packet is a control packet (e.g., GTP-C or Radius), module 504 can pass the packet to session management module 506. Alternatively, if traffic discriminator module 504 determines that the ingested packet is a data packet (e.g., GTP-U or SGi), module 504 can pass the packet to data traffic rule lookup module 510.

5.C Session Management

Session management module 506 is responsible for processing control traffic received at session director node 222, in accordance with blocks 308-314 of workflow 300. In particular, upon receiving a control packet from traffic discriminator module 504, session management module 506 can extract information from the control packet that is usable for identifying a communication session or flow within core network 204 to which the control packet belongs. As mentioned previously, in the case of an LTE core network, this information can include, e.g., IMSI, APN, TEID, UE IP address, and so on. Session management module 506 can store this extracted information as a session entry in in-memory cache 508.

In addition, session management module 506 can determine an appropriate egress port of BPB 218 on which the control packet, as well as all correlated data traffic, should be sent out. This step can comprise referencing the mappings in the load balance table and selecting the egress port ID that is mapped to the current session identifier (e.g., IMSI).

Finally, session management module 506 can generate a dynamic forwarding rule for subsequent data traffic that is received from core network 204 and is correlated with the current control packet/session. This dynamic forwarding rule can include, as lookup parameters, one or more identifiers that may be included in such data traffic (such as UE IP address, TEID, etc.), and an action to forward all matched packets to the egress port determined for the session. Session management module 506 can store this dynamically generated forwarding rule in in-memory cache 508 for use by data traffic rule lookup module 510 as discussed below.

It should be noted that session management module 506 is not limited to processing control traffic for a single type of control/signaling protocol; rather, module 506 can be configured to identify multiple different types of control protocols used in core network 204 (e.g., GTP-C or Radius) and generate appropriate forwarding rules for data traffic correlated with each control protocol (e.g., GTP-U or SGi data traffic).

5.D Data Traffic Rule Lookup

Data traffic rule lookup module 510 is responsible for receiving data traffic that is passed by traffic discriminator module 504 and determining an initial egress port of BPB 218 on which the data packet should be sent out, based on the session information established by session management module 506. In particular, data traffic rule lookup module 510 can first correlate each received data packet with a communication session maintained in in-memory cache 508. In the case where core network 204 is an LTE network, this can involve, e.g., matching a UE IP, TEID, or other parameters in the data packet with the various session entries stored in cache 508.

Upon correlating the data packet with a particular session, data traffic rule lookup module 510 can find and apply the dynamic forwarding rule for the session stored in cache 508 to that data packet, thereby identifying the appropriate egress port for the packet. In scenarios where no dynamic forwarding rule exists, data traffic rule lookup module 510 can apply a default rule to the data packet (e.g., a rule that statically maps one or more header fields of the packet to a particular egress port).

5.E Traffic Filtering/Forwarding

Traffic filtering/forwarding module 512 is responsible for applying user-defined filtering and forwarding policies, if any such policies exist, to the data traffic that has been processed by data traffic rule lookup module 510. These policies, which can be based on any number of parameters such as IMSI, APN, user location, eNodeB, SGW, MME, radio access technology (RAT) type, charging (e.g., prepaid or postpaid) status. IMEI, etc., allows node 222 to implement custom filtering and forwarding behavior that alter the initial load-balanced assignment of data packets to egress ports as discussed above.

For instance, in one embodiment, traffic filtering/forwarding module 512 can apply one or more user-defined filtering policies that automatically drop all data packets that are associated with a particular IMSI or APN or a range of IMSIs. In another embodiment, traffic filtering/forwarding module 512 can apply one or more user-defined forwarding policies that forward all data packets associated with a particular IMSI/APN or a range of IMSIs to a particular egress port, or group of egress ports, on BPB 218. In yet other embodiments, traffic filtering/forwarding module 512 can apply one or more user-defined filtering/forwarding policies that drop or forward traffic based on other criteria (e.g., all VOLTE traffic, traffic from certain types of UE devices based on IMEI, etc.). These filtering/forwarding policies will override the initial egress port assignments made by data traffic rule lookup module 510.

If multiple filtering/forwarding policies are defined on node 222, traffic filtering/forwarding module 512 can cascade the various policies in a user-defined order, or according to user-defined priorities that are attached to each policy. For example, assume a first policy is defined that forwards all traffic associated with IMSI "1234567" out of egress port 3/1 of BPB 218, and this first policy is assigned a user-defined priority of 1. Further assume a second policy is defined that drops all traffic associated with APN "volte.sf.net" and this second policy is assigned a user-defined priority of 2. In this scenario, if a packet is received that is associated with IMSI 1234567 and APN volte.sf.net, the first policy will take precedence over the second policy per their respective priorities, and thus the packet will be forwarded out of egress port 3/1. If a second packet is received that is associated with IMSI 2345678 and APN volte.sf.net, the first policy is no longer relevant, and thus the second policy will be applied and the packet will be dropped.

Once traffic filtering/forwarding module 512 has completed its processing, module 512 can pass on the data traffic to deduplication module 514 (or directly to transmitter module 516 in cases where only certain flows should be deduplicated).

5.F Deduplication

In certain scenarios, multiple copies of the same control or data packet may be replicated from core network 204 and sent to packet broker 206. For example, the same packet may traverse multiple interfaces in core network 204 and may be tapped more than once. Or, the same packet content may be encapsulated multiple times into different packets by different protocols in core network 204, such that the packet payload is identical across the packets (i.e., only protocol headers are different). To address this, deduplication module 514 is configured to identify and filter such duplicate traffic before it can reach analytic probes/tools 208.

Figure 6:
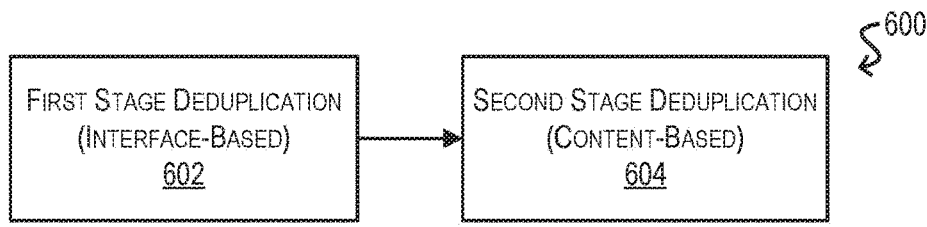
FIG. 6 is a simplified block diagram of a traffic deduplication process according to an embodiment.

FIG. 6 depicts a block diagram of a two-stage process 600 that can be executed by deduplication module 514 for deduplicating control/data traffic according to an embodiment. As shown, at block 602 of process 600, deduplication module 514 can receive a control/data packet and can implement a first stage deduplication based on the core network interfaces from which the control/data packet was replicated. For example, in the case where core network 204 is an LTE network, the traffic sent on the S1U and S5/S8 interfaces are known to be identical. Accordingly, for this use case, first stage deduplication 602 can apply one or more interface-based filtering rules that allow S1U traffic to be forwarded while dropping S5/S8 traffic.

Once the first stage deduplication has been completed, deduplication module 514 can implement a second stage deduplication (block 604) that is based on the content of the control/data packet. More particularly, deduplication module 514 can calculate a cyclical redundancy check (CRC) value for the payload of the control/data packet (or extract such a CRC value from the packet header, if it exists there), and compare the packet's CRC value with stored CRC values of other packets that have been previously processed by session director node 222. If the packet's CRC value matches any stored CRC value, deduplication module 514 can conclude that the packet is a duplicate and thus can drop the packet. Alternatively, module 514 can perform an additional check (e.g., compare one or more parameters of the current packet and the previous packet, such as TEID, UE IP address, etc.) before dropping the current packet. If the packet's CRC value does not match any stored CRC value, deduplication module 514 can conclude that the packet is not a duplicate and pass the packet to transmitter module 516 of architecture 500.

Taken together, the two deduplication stages shown in process 600 enable deduplication module 514 to comprehensively identify and filter all duplicate traffic originating from core network 204.

Figure 7:
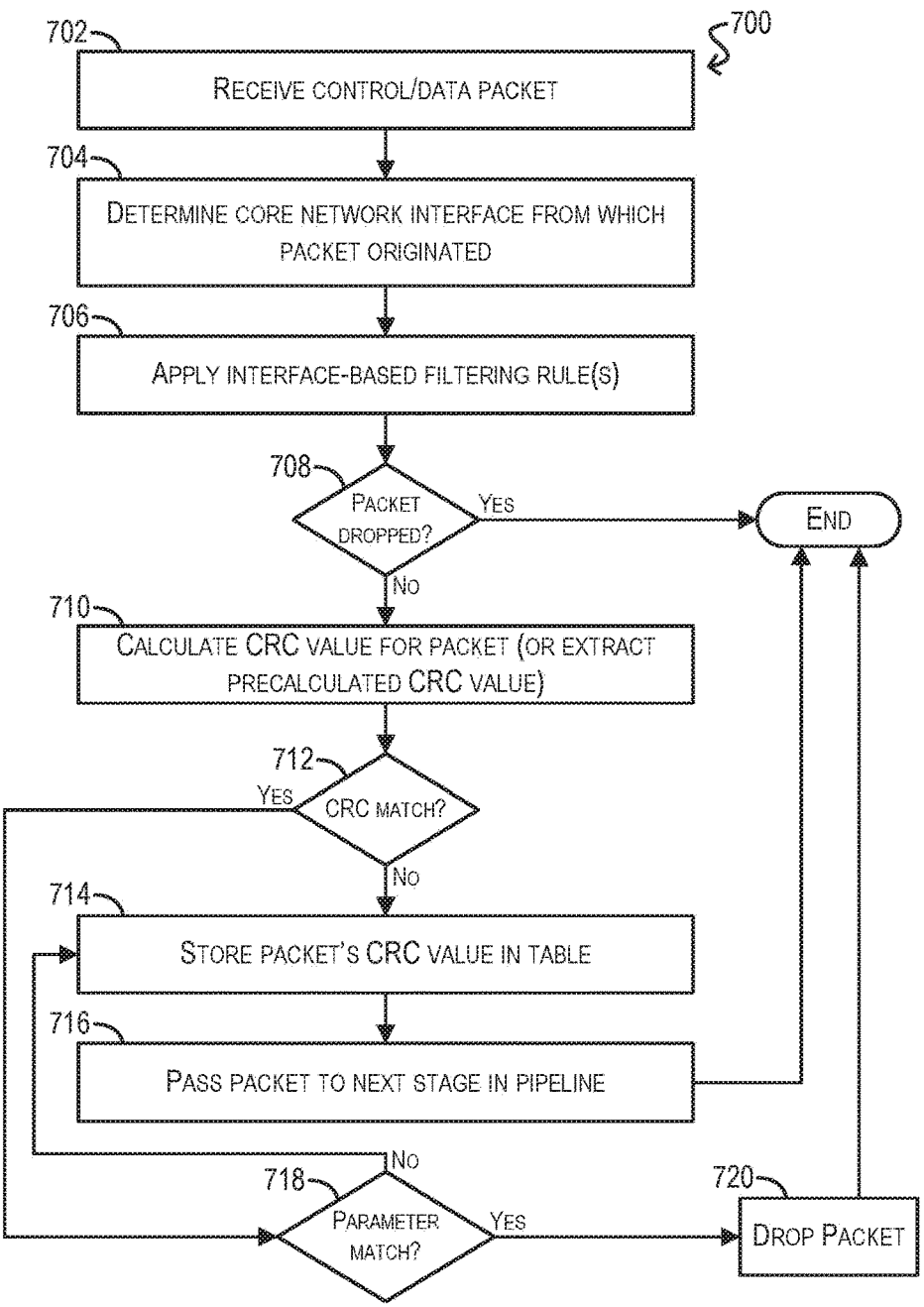
FIG. 7 depicts a workflow for the traffic deduplication process of FIG. 6 according to an embodiment.

FIG. 7 depicts a workflow 700 that provides additional details regarding the deduplication processing performed by deduplication module 514 according to an embodiment. Starting with block 702, deduplication module 514 can receive (from, e.g., traffic filtering/forwarding module 512) a control/data packet that was replicated from core network 204.

At block 704, deduplication module 514 can determine an interface in core network 204 from which the packet originated. Module 514 can perform this determination by, e.g., examining one or more header fields of the packet, and/or session information stored in in-memory cache 208. Deduplication module 514 can then apply one or more preconfigured filtering rules based on the packet's associated interface (block 706). These interface-based filtering rules will generally differ depending on the nature of core network 204. For instance, in mobile (e.g., LTE) networks, traffic that is sent on the S1U and S5/S8 interfaces will typically be identical. Thus, in this context, deduplication module 514 can be configured with one or more filtering rules that allow traffic tapped from the S1U interface and drop traffic tapped from the S5/S8 interface (or vice versa).

Upon applying the interface-based filtering rules at block 706, deduplication module 514 can check whether the packet has been dropped or not (block 708). If the packet has been dropped, workflow 700 can end.

On the other hand, if the packet has not been dropped, deduplication module 514 can calculate a CRC value for the packet based on the packet's payload (block 710). Alternatively, if the packet already includes a precomputed CRC value in its header, module 514 can extract the precomputed CRC value from the packet header. This precomputed CRC value can correspond to, e.g., a Layer 2 frame check sequence (FCS), a Layer 3 (IP) CRC, a Layer 4 checksum, and/or any combination of these values. Deduplication module 514 can then compare the packet's CRC value against a table of stored CRC values for packets previously processed by module 514 (block 712).

If the packet's CRC value does not match any of the stored CRC values, deduplication module 514 can conclude that the packet is not a duplicate of any previously processed packets. As a result, module 514 can store the packet's CRC value in the CRC table and pass the packet to the next stage in node 222's software pipeline (e.g., transmitter module 516) (blocks 714 and 716).

However, if the packet's CRC value matches the stored CRC value for a previous packet, deduplication module 514 can compare one or more parameters of the current packet with the corresponding parameters of the previous packet (block 718). These parameters can include, e.g., communication session-related parameters such as TEID, IMSI, source and destination IP addresses, etc. If the compared parameters match, deduplication module 514 can conclude that the current packet is a duplicate and thus can drop the packet (block 720). Otherwise, deduplication module 514 can conclude that the current packet is a not a duplicate and thus can store the packet's CRC value in the CRC table and pass the packet to the next stage in node 222's software pipeline as per blocks 714 and 716. At the conclusion of either block 720 or 716, workflow 700 can end.

5.G Transmitter

Transmitter module 516 is responsible for tagging the control/data packet replicated from core network 204 with egress port information determined via the other modules of software architecture 500. Module 516 can include this information in any field or location within the packet that is made known to BPB 218. Transmitter module 516 can then send the tagged packet back to BPB 218 for forwarding to analytic probes/tools 208 in accordance with the egress port information.

6. Example Network Device

Figure 8:
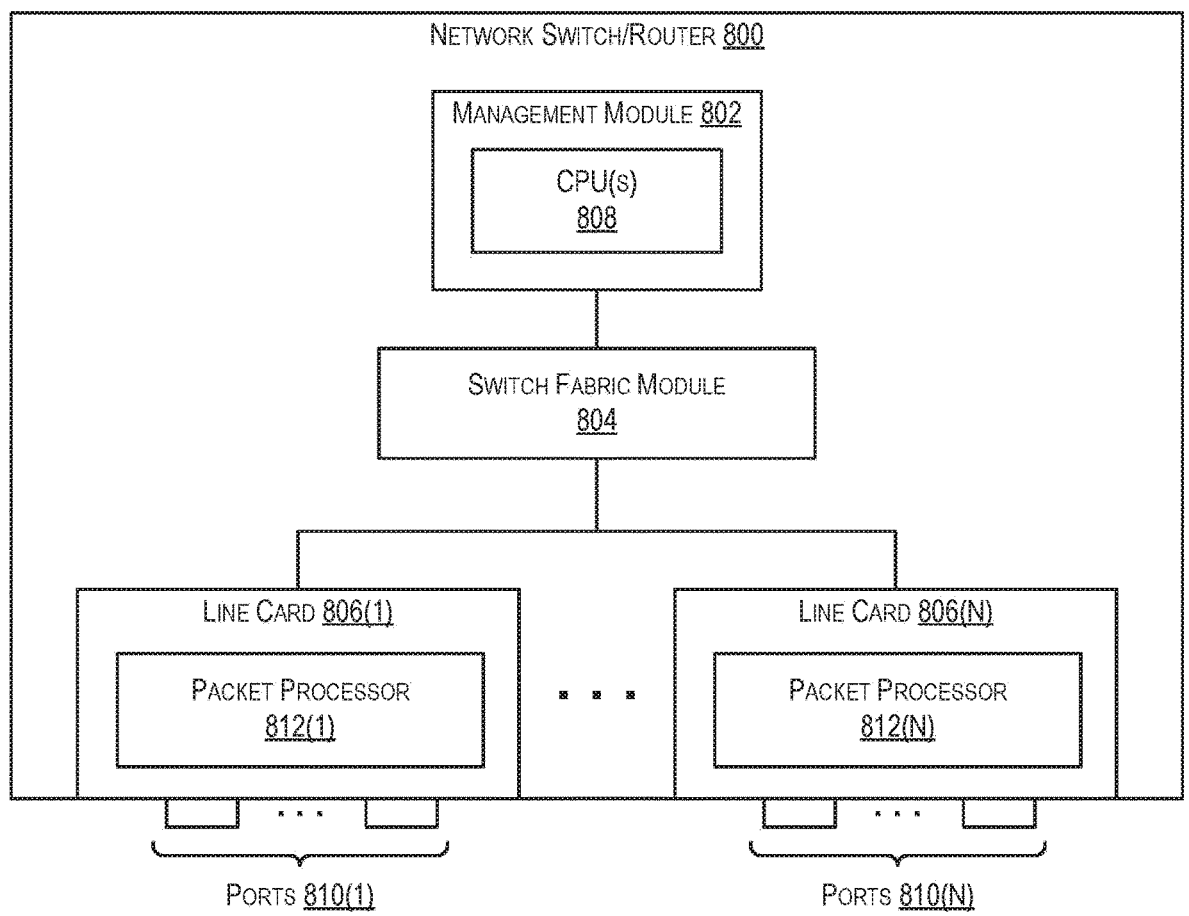
FIG. 8 depicts a network switch/router according to an embodiment.

FIG. 8 depicts an example network device (e.g., switch/router) 800 according to an embodiment. Network switch/router 800 can be used to implement the BPB described throughout this disclosure.

As shown, network switch/router 800 includes a management module 802, a switch fabric module 804, and a number of line cards 806(1)-806(N). Management module 802 includes one or more management CPUs 808 for managing/controlling the operation of the device. Each management CPU 808 can be a general purpose processor, such as a PowerPC, Intel, AMD, or ARM-based processor, that operates under the control of software stored in an associated memory (not shown).

Switch fabric module 804 and line cards 806(1)-806(N) collectively represent the data, or forwarding, plane of network switch/router 800. Switch fabric module 804 is configured to interconnect the various other modules of network switch/router 800. Each line card 806(1)-806(N), which can correspond to the various line cards describe with respect to hardware architecture 400 of FIG. 4, can include one or more ingress/egress ports 810(1)-810(N) that are used by network switch/router 800 to send and receive packets. Each line card 806(1)-806(N) can also include a packet processor 812(1)-812(N). Packet processor 812(1)-812(N) is a hardware processing component (e.g., an FPGA or ASIC) that can make wire speed decisions on how to handle incoming or outgoing traffic.

It should be appreciated that network switch/router 800 is illustrative and not intended to limit embodiments of the present invention. Many other configurations having more or fewer components than switch/router 800 are possible.

7. Example Computer System

Figure 9:
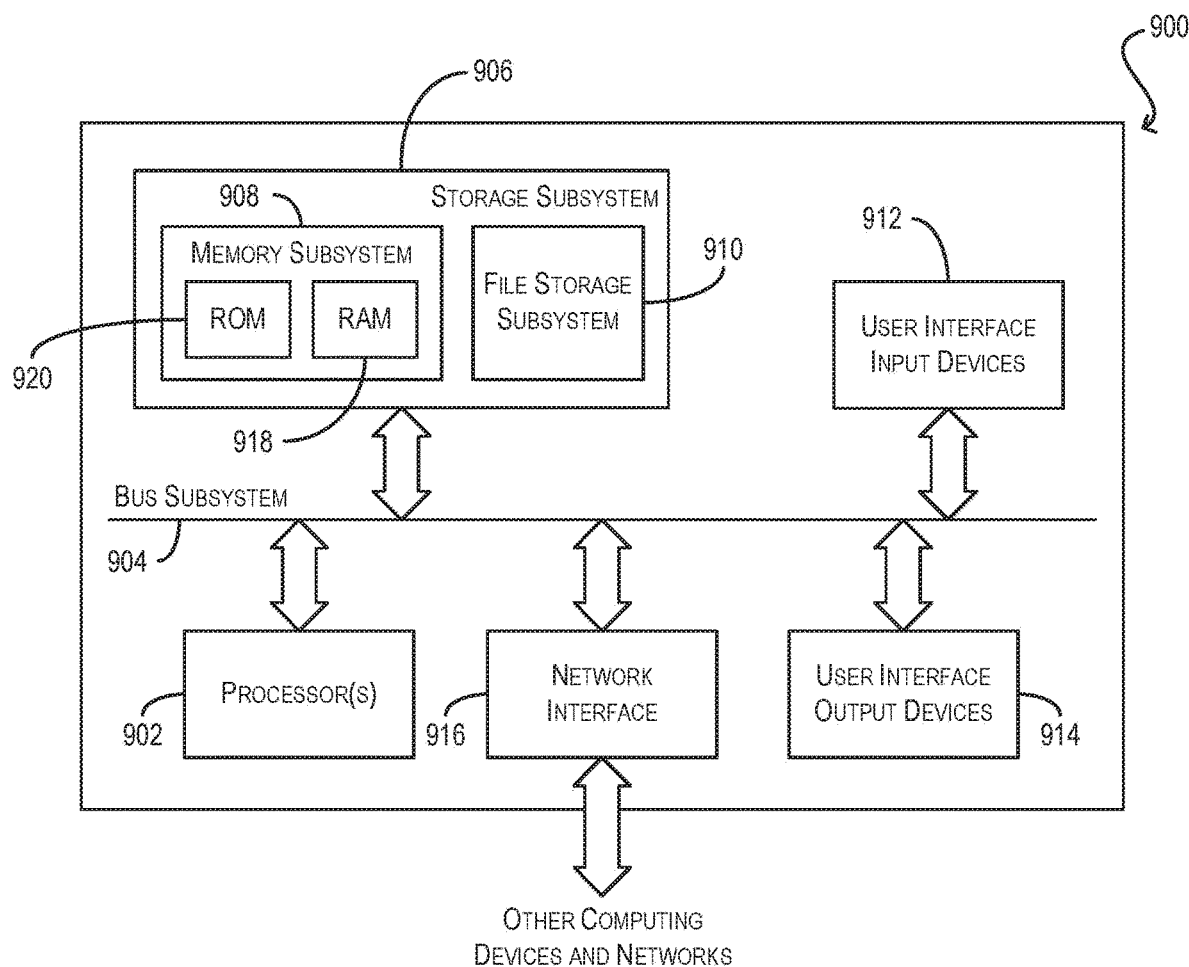
FIG. 9 depicts a computer system according to an embodiment.

FIG. 9 depicts an example computer system 900 according to an embodiment. Computer system 900 can be used to implement the nodes of the session director cluster described throughout this disclosure.

As shown in FIG. 9, computer system 900 can include one or more general purpose processors (e.g., CPUs) 902 that communicate with a number of peripheral devices via a bus subsystem 904. These peripheral devices can include a storage subsystem 906 (comprising a memory subsystem 908 and a file storage subsystem 910), user interface input devices 912, user interface output devices 914, and a network interface subsystem 916.

Bus subsystem 904 can provide a mechanism for letting the various components and subsystems of computer system 900 communicate with each other as intended. Although bus subsystem 904 is shown schematically as a single bus, alternative embodiments of the bus subsystem can utilize multiple buses.

Network interface subsystem 916 can serve as an interface for communicating data between computer system 900 and other computing devices or networks. Embodiments of network interface subsystem 916 can include wired (e.g., coaxial, twisted pair, or fiber optic Ethernet) and/or wireless (e.g., Wi-Fi, cellular, Bluetooth, etc.) interfaces.

User interface input devices 912 can include a keyboard, pointing devices (e.g., mouse, trackball, touchpad, etc.), a scanner, a barcode scanner, a touch-screen incorporated into a display, audio input devices (e.g., voice recognition systems, microphones, etc.), and other types of input devices. In general, use of the term "input device" is intended to include all possible types of devices and mechanisms for inputting information into computer system 900.

User interface output devices 914 can include a display subsystem, a printer, a fax machine, or non-visual displays such as audio output devices, etc. The display subsystem can be a cathode ray tube (CRT), a flat-panel device such as a liquid crystal display (LCD), or a projection device. In general, use of the term "output device" is intended to include all possible types of devices and mechanisms for outputting information from computer system 900.

Storage subsystem 906 can include a memory subsystem 908 and a file/disk storage subsystem 910. Subsystems 908 and 910 represent non-transitory computer-readable storage media that can store program code and/or data that provide the functionality of various embodiments described herein.

Memory subsystem 908 can include a number of memories including a main random access memory (RAM) 918 for storage of instructions and data during program execution and a read-only memory (ROM) 920 in which fixed instructions are stored. File storage subsystem 910 can provide persistent (i.e., nonvolatile) storage for program and data files and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 900 is illustrative and not intended to limit embodiments of the present disclosure. Many other configurations having more or fewer components than computer system 900 are possible.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. For example, although certain embodiments have been described with respect to particular workflows and steps, if should be apparent to those skilled in the art that the scope of the present disclosure is not strictly limited to the described workflows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the invention as set forth in the following claims.

What is claimed is:

1. An apparatus, comprising:
   a traffic discriminator module;
   a session management module;
   a data traffic rule lookup module;
   a data deduplication module;
   at least one processor; and
   a memory stored with program code stored thereon, wherein, when the program code is executed, the at least one processor is configured to:
   determine, by the traffic discriminator module, whether a packet is a control packet or a data packet;
   receive, at the session management module from the traffic discriminator module, the packet in response to determining the packet to be a control packet;
   receive, at the data traffic rule lookup module from the traffic discriminator module, the packet in response to determining the packet to be a data packet;
   extract, at the session management module, control information from the control packet, wherein the control information is used to identify a session associated with the control packet;
   determine, at the data traffic rule lookup module, a forwarding rule based on the control information, wherein the forwarding rule comprises egress port information;
   receive, at the data deduplication module from the session management module, the packet;
   determine, at the data deduplication module, whether the packet received from the session management module is a duplicate of a previously-received packet;
   in response to the packet being a non-duplicate, determine whether the packet corresponds to the identified session based on the control information; and
   in response to determining that the packet corresponds to the identified session, transmit the packet over an egress port based on the egress port information.

2. The apparatus of claim 1, wherein, when the program code is executed, the at least one processor is further configured to:
   identify a traffic flow associated with the control information; and
   store the control information and the identified session in the memory.

3. The apparatus of claim 1, wherein, when the program code is executed, the at least one processor is further configured to:
   determine the egress port based on a mapping between the egress port and the control information; and
   generate the forwarding rule to forward data packets associated with the identified session to the egress port.

4. The apparatus of claim 1, wherein, when the program code is executed, the at least one processor is further configured to:
   calculate a first cyclic redundancy check (CRC) value of the data packet;
   calculate a second CRC value of a new data packet;
   compare the first and the second CRC values;
   in response to the first and the second CRC values being the same, compare a header parameter of the data packet with a header parameter of the new data packet; and
   in response to the header parameter of the data packet matching the header parameter of the new data packet, drop the data packet or the new data packet.

5. A method, comprising:
   determining, by a traffic discriminator module of a packet broker, whether a packet is a control packet or a data packet;
   receiving, at a session management module of the packet broker from the traffic discriminator module, the packet in response to determining the packet to be a control packet;
   receiving, at a data traffic rule lookup module of the packet broker from the traffic discriminator module, the packet in response to determining the packet to be a data packet;
   extracting, at the session management module, control information from the control packet, wherein the control information is used to identify a session associated with the control packet;
   determining, at the data traffic rule lookup module, a forwarding rule based on the control information in the control packet;
   receiving, at a data deduplication module of the packet broker from the session management module, the packet;
   determining, at the data deduplication module, whether the packet is a duplicate of a previously-received packet;
   in response to the packet being a non-duplicate, determining, at the data deduplication module, whether the packet corresponds to the identified session based on the control information; and
   in response to determining that the packet corresponds to the identified session, tagging, at the packet broker, the packet with egress port information corresponding to the forwarding rule to transmit over an egress port based on the egress port information.

6. The method of claim 5, further comprising:
   identifying a traffic flow associated with the control information, wherein the control information each comprises one or more of an international mobile subscriber identity (IMSI), an access point name (APN), a tunnel endpoint identifier (TEID), and a user equipment (UE) Internet Protocol (IP) address.

7. The method of claim 5, further comprising:
determining the egress port based on a mapping between the egress port and the control information; and
generating the forwarding rule to forward information associated with the identified session to the egress port.

8. The method of claim 5, further comprising:
calculating a first cyclic redundancy check (CRC) value of the data packet;
calculating a second CRC value of a new data packet;
comparing the first CRC value to the second CRC value;
in response to the first CRC value and the second CRC value being the same, comparing a header parameter of the data packet to a header parameter of the new data packet; and
in response to the header parameter of the data packet matching the header parameter of the new data packet, dropping the data packet or the new data packet.

9. A system, comprising:
a packet broker configured to transmit a data packet;
a session management device configured to extract control information from the data packet;
a data traffic rule lookup device configured to determine a forwarding rule based on the extracted control information;
a traffic discriminator device configured to:
  receive the data packet from the packet broker;
  identify information in the data packet;
  in response to the identified information being control information, forward the data packet to the session management device; and
  in response to the identified information being data information, forward the data packet to the data traffic rule lookup device;
a data deduplication device configured to:
  receive the data packet from the session management device;
  determine whether the data packet is a duplicate of a previously-received data packet; and
  in response to the data packet being a non-duplicate, forward the data packet; and
a transmitter device comprising an egress port, where the transmitter device is configured to:
  receive the data packet from the data deduplication device;
  tag the data packet with egress port information; and
  transmit the data packet over the egress port.

10. The system of claim 9, wherein the session management device is further configured to:
identify a traffic flow associated with the extracted control information; and
store the extracted control information in a memory.

11. The system of claim 9, wherein the extracted control information comprises one or more of an international mobile subscriber identity (IMSI), an access point name (APN), a tunnel endpoint identifier (TED), and a user equipment (UE) Internet Protocol (IP) address.

12. The system of claim 9, wherein the session management device is further configured to:
determine the egress port based on a mapping between the egress port and the extracted control information; and
generate the forwarding rule to forward information associated with the data packet to the egress port.

13. The system of claim 9, wherein the data traffic rule lookup device is further configured to:
receive a new data packet from the traffic discriminator device;
compare control information in the new data packet to the extracted control information to determine the forwarding rule; and
forward the new data packet to the egress port.

14. The system of claim 9, further comprising:
a configuration management device configured to accept configuration information comprising:
  inputs to generate a load balance table; and
  a policy to filter or forward the data packet.

15. The system of claim 9, further comprising a traffic filtering device configured to:
determine at least one policy to filter or forward the data packet based on a criterion comprising one of an international mobile subscriber identity (IMSI), an access point name (APN), a tunnel endpoint identifier (TEID), location of a user equipment (UE), radio access technology (RAT), and a type of the UE.

16. The system of claim 9, wherein the data deduplication device is further configured to:
calculate a first cyclic redundancy check (CRC) value of the data packet;
calculate a second CRC value of a new data packet;
compare the first CRC value to the second CRC value;
in response to the first CRC value and the second CRC value being the same, compare a header parameter of the data packet to a header parameter of the new data packet; and
in response to the header parameter of the data packet matching the header parameter of the new data packet, drop the data packet or the new data packet.

17. The system of claim 16, wherein the deduplication device further is configured to:
in response to determining the header parameter of the data packet is different from the header parameter of the new data packet, forward the data packet and the new data packet to the egress port.

* * * * *

UNITED STATES PATENT AND TRADEMARK OFFICE
CERTIFICATE OF CORRECTION

PATENT NO. : 10,855,562 B2
APPLICATION NO. : 16/148969
DATED : December 1, 2020
INVENTOR(S) : Deepak Hegde et al.

Page 1 of 1

It is certified that error appears in the above-identified patent and that said Letters Patent is hereby corrected as shown below:

On the Title Page

Item (73), Assignee, "Extreme Networks, LLC, San Jose, CA (US)" should read --Extreme Networks, Inc., San Jose, CA (US)--.

In the Claims

Claim 11, Column 18, Line 4, "a tunnel endpoint identifier (TED), and a user" should read --a tunnel endpoint identifier (TEID), and a user--.

Signed and Sealed this
Fifth Day of October, 2021

Drew Hirshfeld
*Performing the Functions and Duties of the*
*Under Secretary of Commerce for Intellectual Property and*
*Director of the United States Patent and Trademark Office*